United States Patent
Ye et al.

(10) Patent No.: US 11,792,630 B2
(45) Date of Patent: Oct. 17, 2023

(54) UPLINK TRANSMISSION IN TDD SUPPORTING FENB-IOT OPERATION

(71) Applicant: Apple Inc., Cupertino, CA (US)

(72) Inventors: Qiaoyang Ye, Fremont, CA (US); Debdeep Chatterjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/830,880

(22) Filed: Jun. 2, 2022

(65) Prior Publication Data

US 2022/0353660 A1    Nov. 3, 2022

Related U.S. Application Data

(62) Division of application No. 16/637,239, filed as application No. PCT/US2018/046018 on Aug. 9, 2018, now Pat. No. 11,356,828.

(Continued)

(51) Int. Cl.
*H04W 72/04* (2023.01)
*H04W 4/80* (2018.01)
(Continued)

(52) U.S. Cl.
CPC ............. *H04W 4/80* (2018.02); *H04B 1/713* (2013.01); *H04L 5/0094* (2013.01);
(Continued)

(58) Field of Classification Search
CPC ..... H04W 4/80; H04W 24/08; H04W 72/042; H04W 72/0446; H04W 74/0833;
(Continued)

(56) References Cited

U.S. PATENT DOCUMENTS 9,661,663 B1 *   5/2017   Lin ................... H04W 74/0833
2015/0078221 A1   3/2015   Seo et al.
(Continued)

FOREIGN PATENT DOCUMENTS

WO    2015200804 A1   12/2015
WO    2017039374 A1    3/2017
WO    2017105005       6/2017

OTHER PUBLICATIONS

3GPP TSG-RAN WG1 Meeting #85, WI Rapporteur (Ericsson): "RAN1 agreements for Rel-13 NB-IoT"; R1-165977, Nanjing, China; May 22-26, 2016, XP051141850, 33 pages (Year: 2016).*
(Continued)

*Primary Examiner* — Lan-Huong Truong
(74) *Attorney, Agent, or Firm* — Kowert, Hood, Munyon, Rankin & Goetzel, P.C.

(57) ABSTRACT

Embodiments of a User Equipment (UE), generation Node-B (gNB) and methods of communication are generally described herein. The UE may receive a narrowband physical downlink control channel (NPDCCH) that includes an uplink scheduling parameter. The UE may determine an uplink scheduling delay for transmission of a narrowband physical uplink shared channel (NPUSCH) in accordance with time-division duplexing (TDD). The uplink scheduling delay may be based on a sum of a predetermined first number of subframes and a variable second number of subframes. The second number of subframes may be based on a window of variable size that starts when the first number of subframes has elapsed since reception of the NPDCCH, and ends when a number of uplink subframes has elapsed since the start of the window. The number of uplink subframes may be indicated by the uplink scheduling parameter.

20 Claims, 14 Drawing Sheets

Related U.S. Application Data

(60) Provisional application No. 62/586,734, filed on Nov. 15, 2017, provisional application No. 62/565,784, filed on Sep. 29, 2017, provisional application No. 62/548,266, filed on Aug. 21, 2017, provisional application No. 62/543,718, filed on Aug. 10, 2017, provisional application No. 62/543,644, filed on Aug. 10, 2017.

(51) Int. Cl.
| | |
|---|---|
| *H04B 1/713* | (2011.01) |
| *H04L 5/00* | (2006.01) |
| *H04L 5/14* | (2006.01) |
| *H04W 24/08* | (2009.01) |
| *H04W 72/0446* | (2023.01) |
| *H04W 74/08* | (2009.01) |
| *H04W 72/23* | (2023.01) |

(52) U.S. Cl.
CPC .......... *H04L 5/1469* (2013.01); *H04W 24/08* (2013.01); *H04W 72/0446* (2013.01); *H04W 72/23* (2023.01); *H04W 74/0833* (2013.01)

(58) Field of Classification Search
CPC ............. H04W 72/1284; H04L 5/0094; H04L 5/1469; H04L 5/0007; H04L 5/0044; H04L 5/0053; H04L 1/1854; H04L 1/1887; H04L 5/0012; H04L 1/1812; H04B 1/713
See application file for complete search history.

(56) References Cited

U.S. PATENT DOCUMENTS

| | | |
|---|---|---|
| 2016/0345118 A1 | 11/2016 | Oh |
| 2017/0187494 A1 | 6/2017 | Tirronen et al. |
| 2017/0201932 A1 | 7/2017 | Yeh et al. |
| 2017/0223743 A1 | 8/2017 | Lin et al. |
| 2018/0234951 A1 | 8/2018 | Somichetty et al. |
| 2018/0248675 A1* | 8/2018 | Bhattad ............. H04W 74/0833 |
| 2020/0236524 A1* | 7/2020 | Ye ......................... H04L 5/1469 |

OTHER PUBLICATIONS

IEEE: "Random Access Preamble Design and Detection for 3GPP Narrowband IoT Systems" by Xingqin Lin, Ansuman Adhikary, and Y.-P. Eric Wang, Date: Nov. 6, 2016 (Year: 2016).*

3rd Generation Partnership Project; "Technical Specification Group Radio Access Network; Evolved Universal Terrestrial Radio Access (E-UTRA); Physical channels and modulation (Release 14)", 3GPP TS 36.211, vol. RAN WG1, No. V14.2.0, Mobile Competence Centre; 650, Route Des Lucioles; F-06921 Sophia-Antipolis Cedex France. Mar. 23, 2017, pp. 8-75 (68 Pages).

Extended European Search Report For Patent Application No. EP 18843169; dated Feb. 22, 2021. 11 Pages.

Intel Corporation; "Reamaining details of NB-IoT timing relationships"; 3GPP TSG RAN WG1 NB-IoT Ad-Hoc Meeting #2 R1-161891; Sophia Antipolis, France; Mar. 22, 2016; 4 Pages.

"3rd Generation Partnership Project; Technical Specification Group Radio Access Network; Evolved Universal Terrestrial Radio Access (E-UTRA); Physical channels and modulation (Release 14)", 3GPP Standard; Technical Specification; 3GPP TS 36.211, 3rd Generation Partnership Project (3GPP), Mobile Competence Centre; 650, Route Des Lucioles; F-06921 Sophia-Antipolis Cedex, France; vol. RAN WG1, No. V14.2.0, Mar. 23, 2017, 789 pages.

Partial Supplementary European Search Report for Patent Application No. 18843169.6; dated Nov. 20, 2020; 13 Pages.

Extended European Search Report for EP Patent Application No. 23169360.7; dated Jul. 11, 2023.

Wi rapporteur (Ericsson) "RAN1 agreements for Rel-13 NB-IoT"; 3GPP TSG-RAN WG1 Meeting #85 R1-165977; May 22, 2016.

Intel Corporation "Remaining details of NB-loT timing relationships"; 3GPP RSG RAN WG1 NB-loT Ad-Hoc Meeting #2 R1-161891; Mar. 22, 2016.

* cited by examiner

UPLINK TRANSMISSION IN TDD SUPPORTING FENB-IOT OPERATION

PRIORITY CLAIM

This application is a divisional of U.S. patent application Ser. No. 16/637,239, filed Feb. 6, 2020, which is a United States National Stage filing of International Application No. PCT/US2018/046018, filed Aug. 9, 2018, which claims priority under 35 USC 119(e) to United States Provisional Patent Application Ser. No. 62,543,644, filed Aug. 10, 2017, and to United States Provisional Patent Application Ser. No. 62,543,718, filed Aug. 10, 2017, and to United States Provisional Patent Application Ser. No. 62,543,708, filed Aug. 10, 2017, and to United States Provisional Patent Application Ser. No. 62,548,266, filed Aug. 21, 2017, and to United States Provisional Patent Application Ser. No. 62,565,784, filed Sep. 29, 2017, and to United States Provisional Patent Application Ser. No. 62,586,734, filed Nov. 15, 2017, all of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to further enhanced internet-of-things (feNB-IoT) techniques. Some embodiments relate to internet-of-things (IoT) techniques.

BACKGROUND

Mobile devices may exchange data in accordance with time-division duplexing (TDD) arrangements. Such systems may be useful in various scenarios. For instance, when a block of spectrum is available, but blocks of paired spectrum are not available, a TDD arrangement may be a good option. In some scenarios, different configurations of uplink subframes and downlink subframes within a radio frame may be possible. Allocation of resources and/or scheduling of transmissions for such configurations may be challenging. Accordingly, there is a general need for methods and systems to enable TDD operation in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
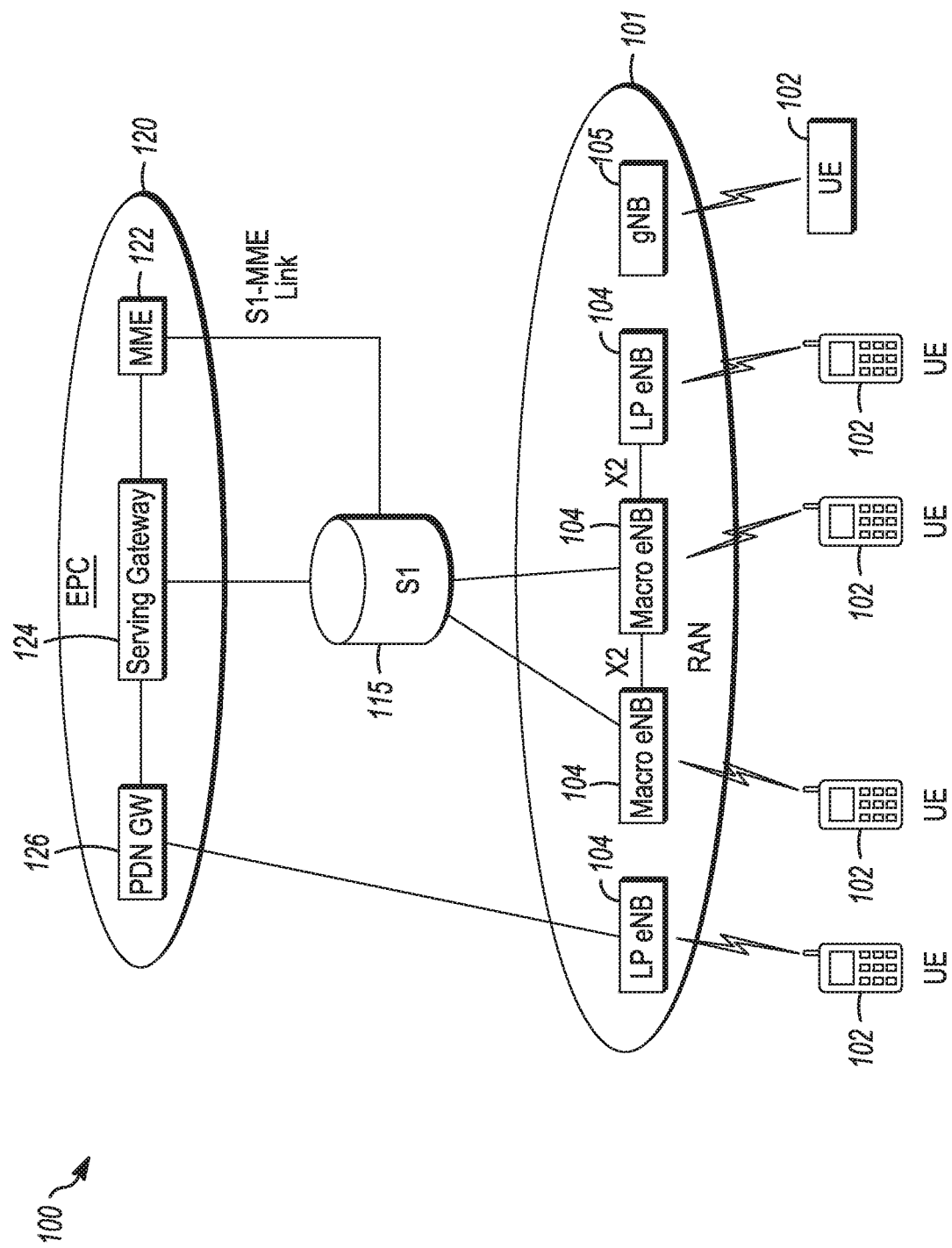
FIG. 1A is a functional diagram of an example network in accordance with some embodiments.
Figure 1B:
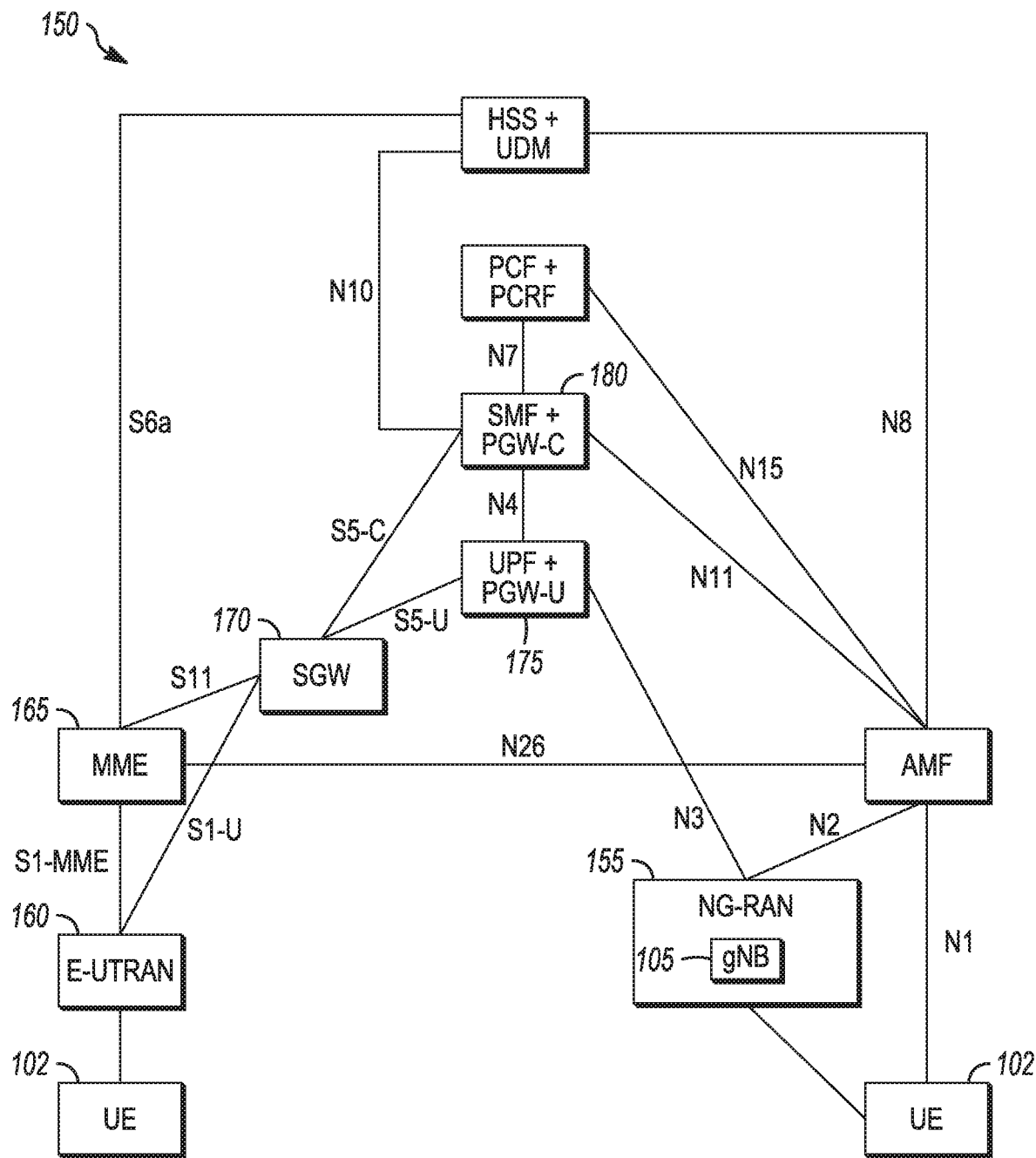
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, one or more of the UEs 102, eNBs 104 and/or gNBs 105 may be configured to operate in accordance with technique(s), protocol(s) and/or standard(s) related to one or more of: internet-of-things (IoT), narrow-band IoT (NB IoT), enhanced NB IoT (eNB-IoT), further enhanced narrowband IoT (feNB-IoT) and/or other.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
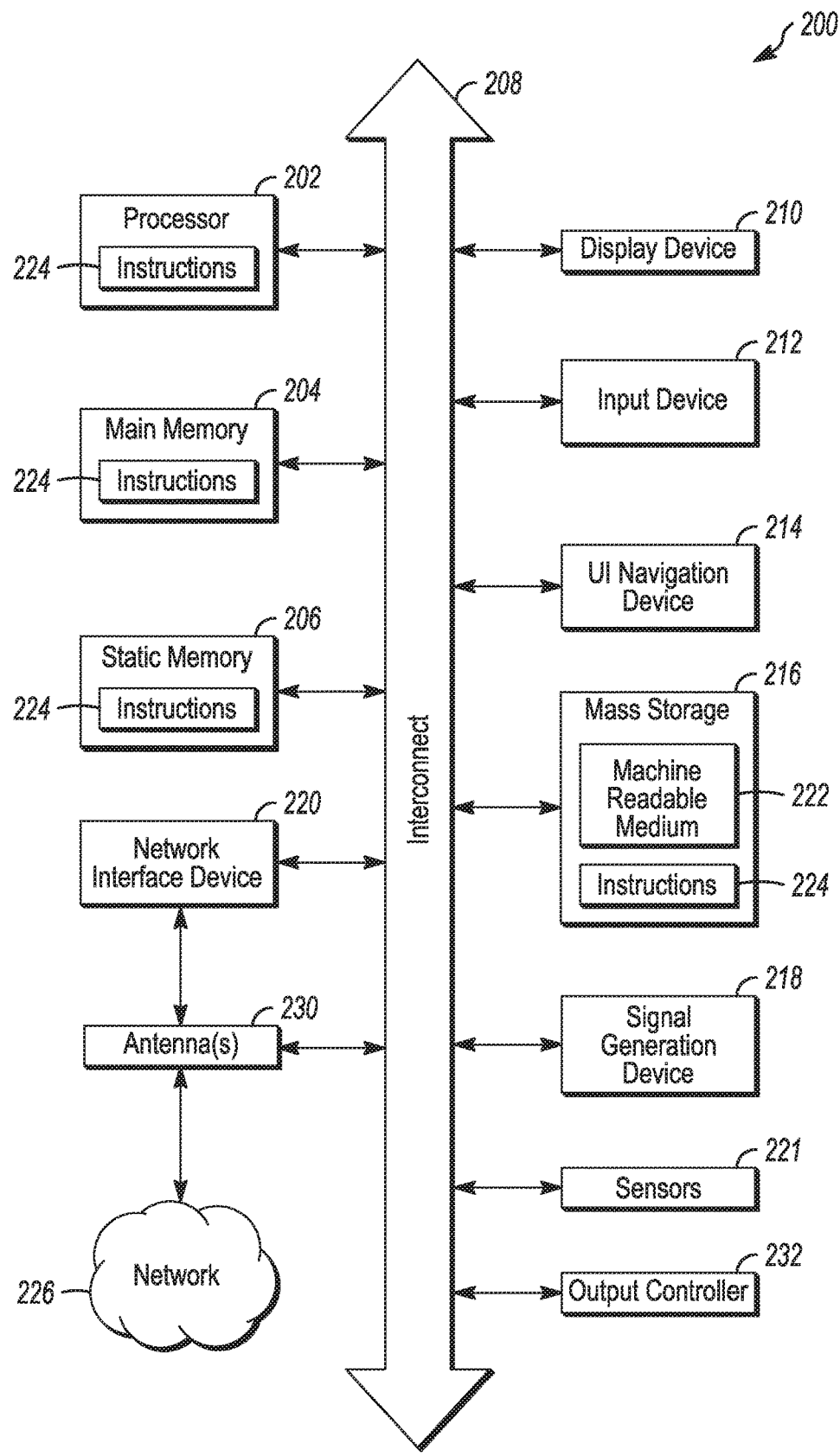
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
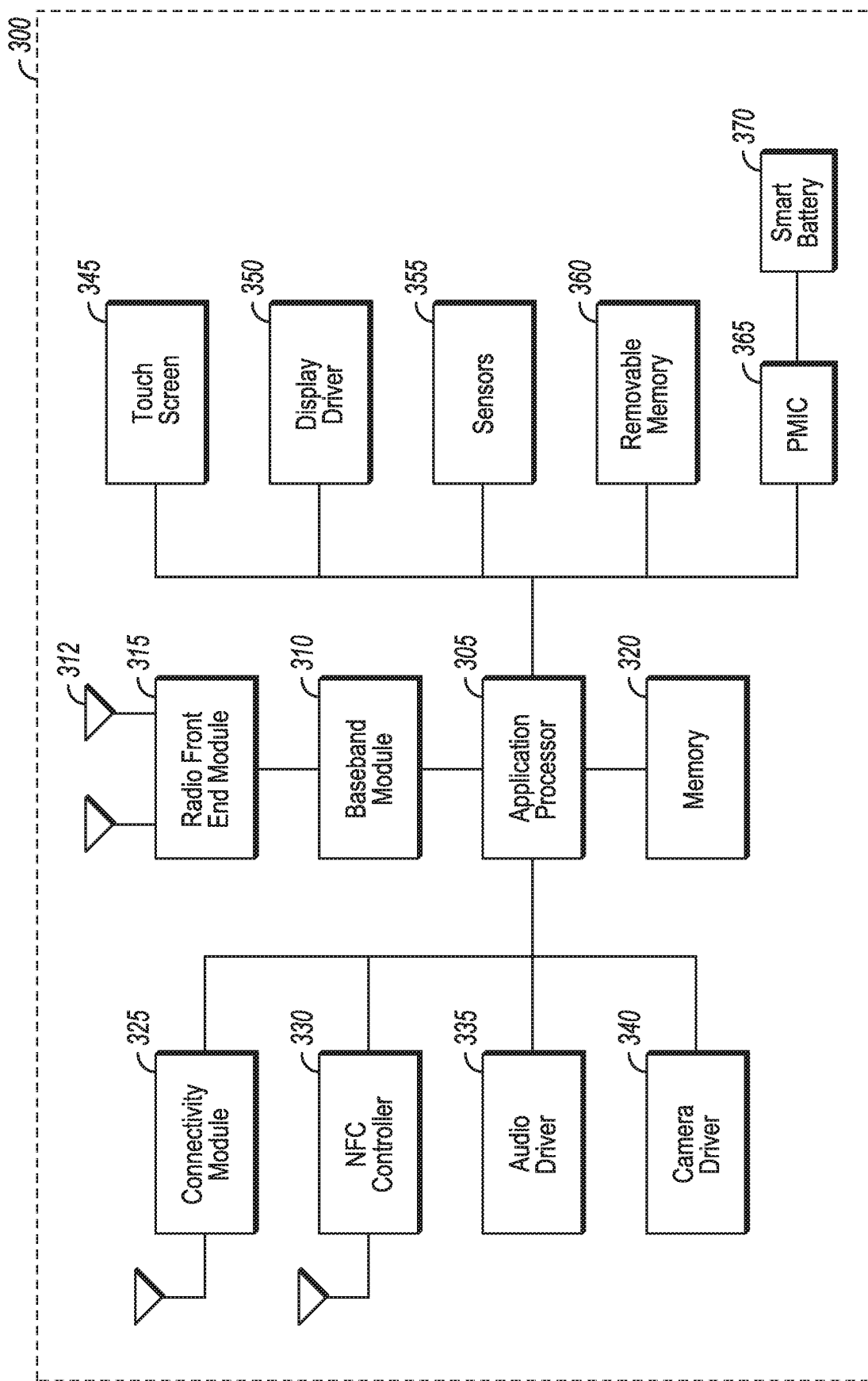
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
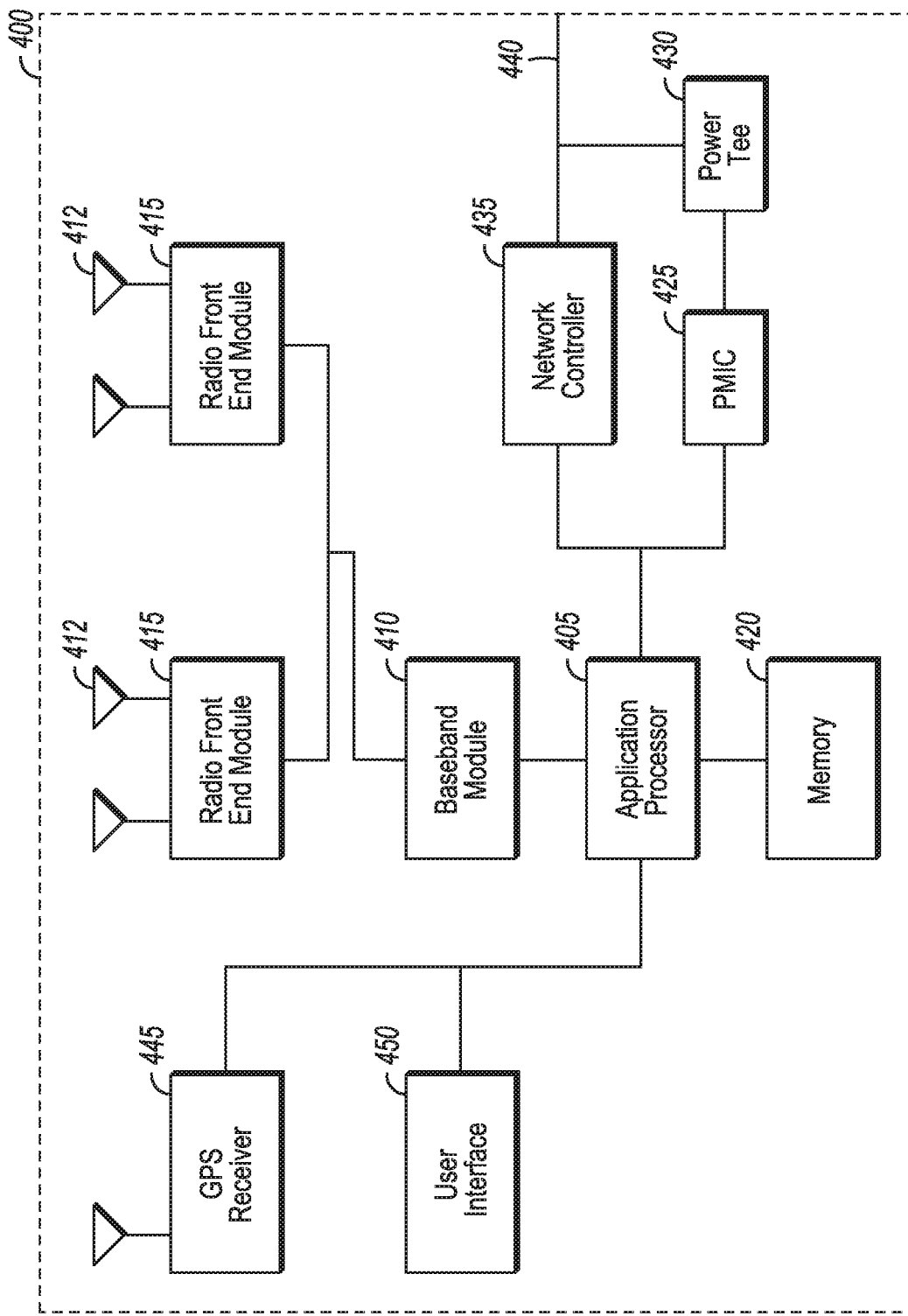
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
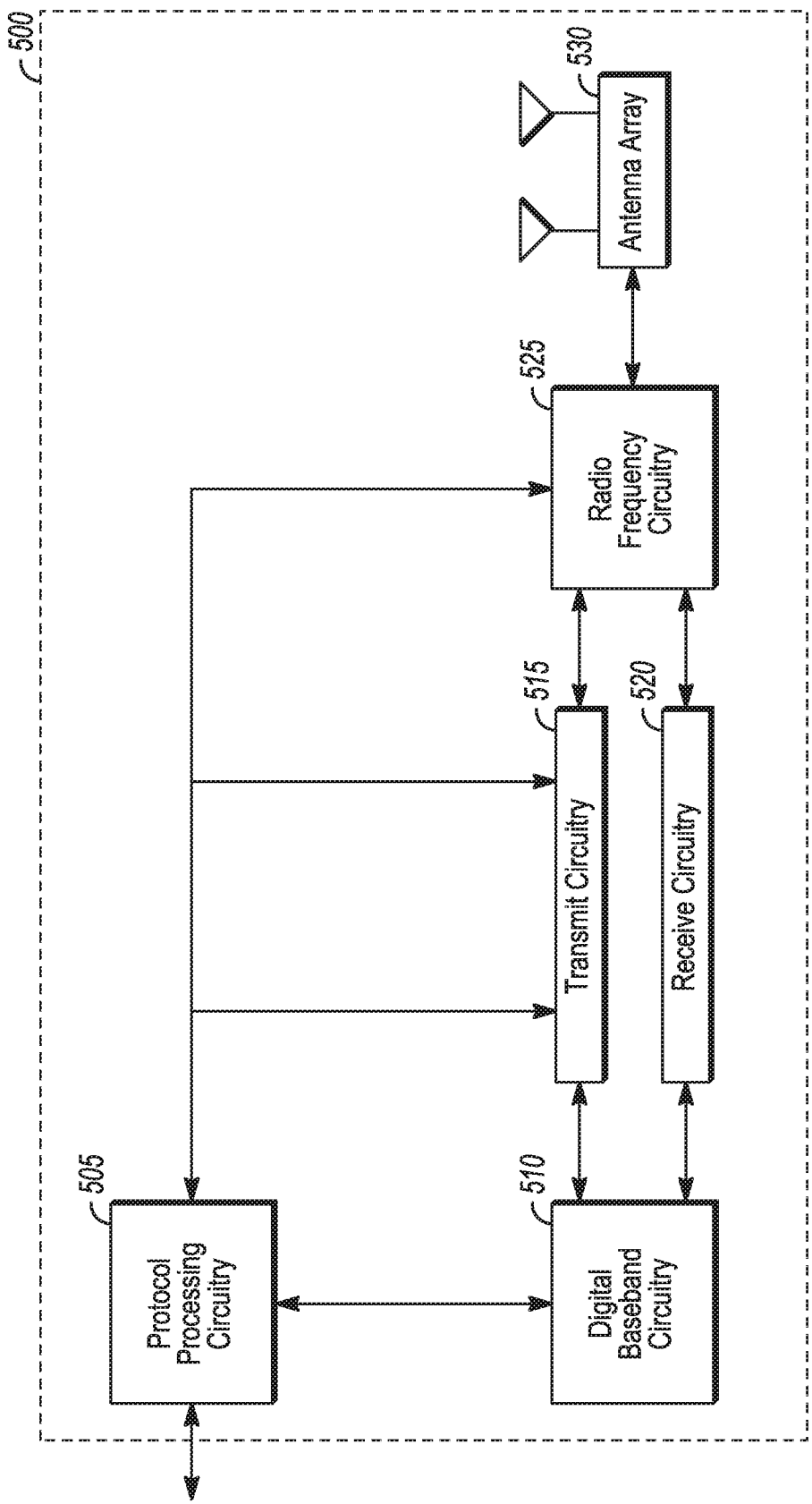
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
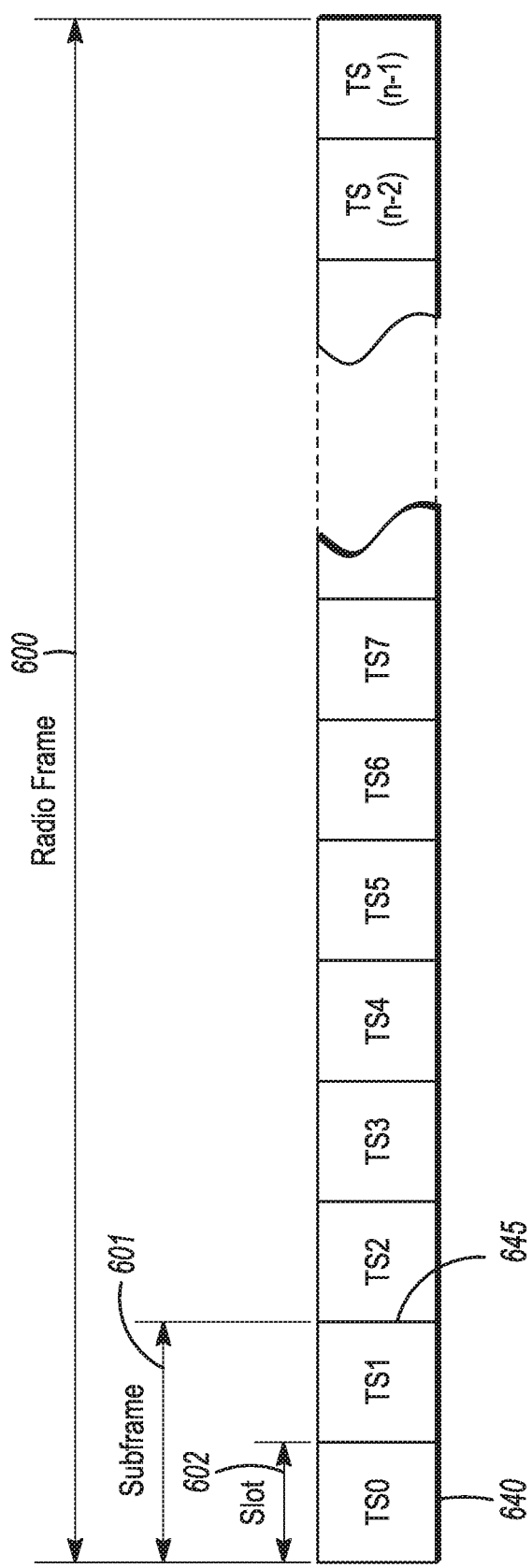
FIG. 6 illustrates an example of a radio frame structure in accordance with some embodiments.
Figure 7A:
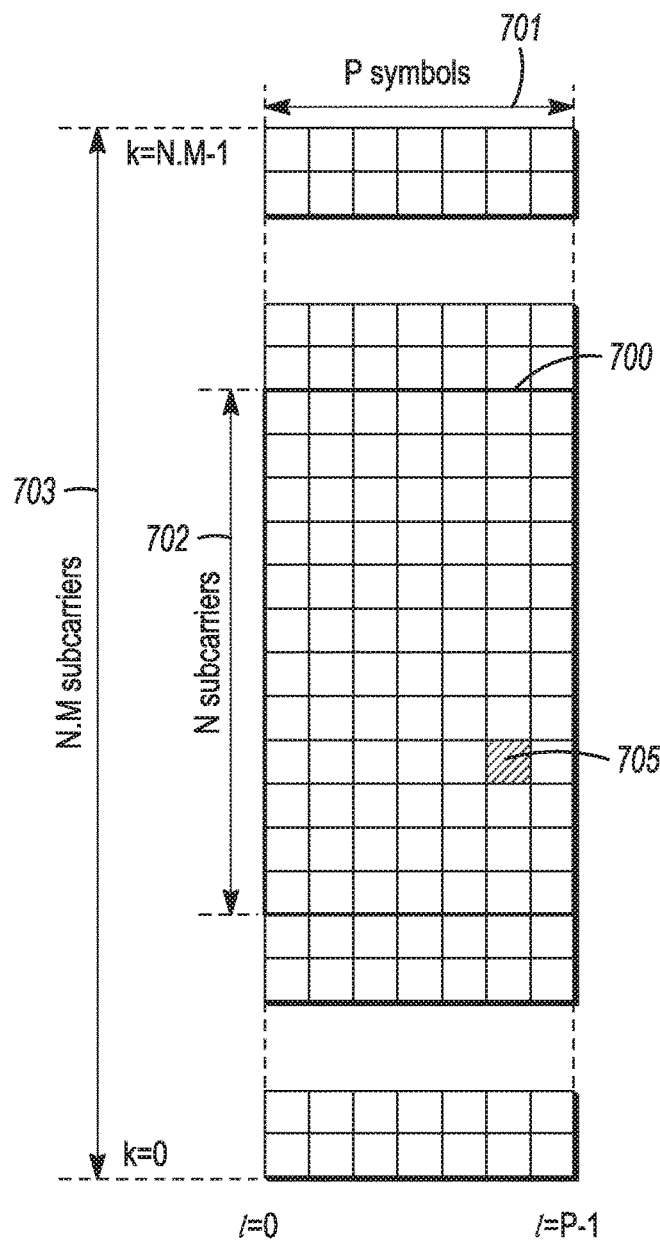
FIG. 7A and FIG. 7B illustrate example frequency resources in accordance with some embodiments.
Figure 7B:
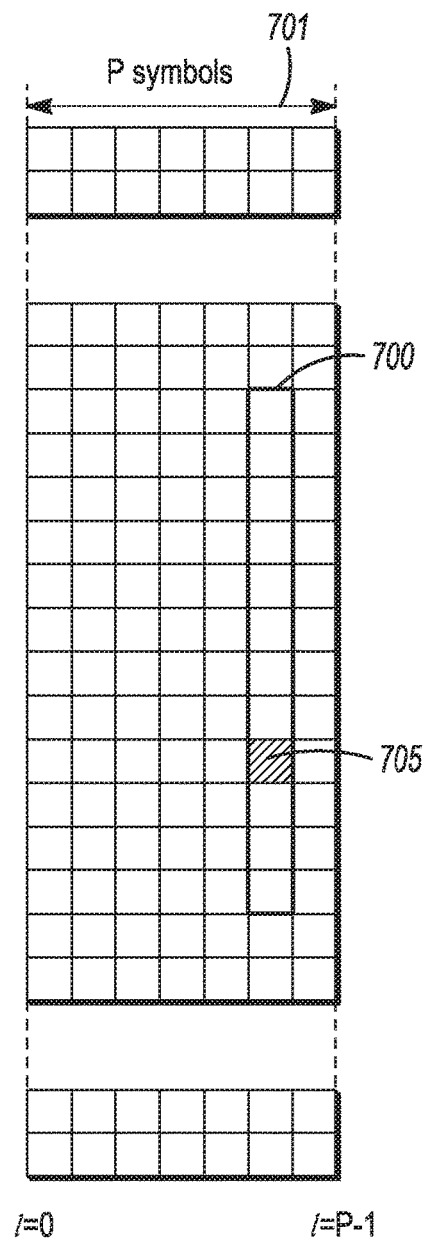

FIG. 6 illustrates an example of a radio frame structure in accordance with some embodiments. FIGS. 7A and 7B illustrate example frequency resources in accordance with some embodiments. In references herein. "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard. 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the UE 102 may receive a narrowband physical downlink control channel (NPDCCH) that schedules a transmission, by the UE 102, of a narrowband physical uplink shared channel (NPUSCH) in one or more radio frames. The radio frames may be configured for time-division duplexing (TDD) operation. Subframes of the radio frames may include uplink subframes and downlink subframes. The UE 102 may determine an uplink scheduling delay for the transmission of the NPUSCH based on a sum of a predetermined first number of subframes and a variable second number of subframes. The second number of subframes may be based on a window of variable size. The window may start when the first number of subframes has elapsed since reception of the NPDCCH. The window may end when a number of uplink subframes has elapsed since the start of the window. The number of uplink subframes may be indicated by an uplink scheduling parameter included in the NPDCCH. These embodiments are described in more detail below.

Figure 8:
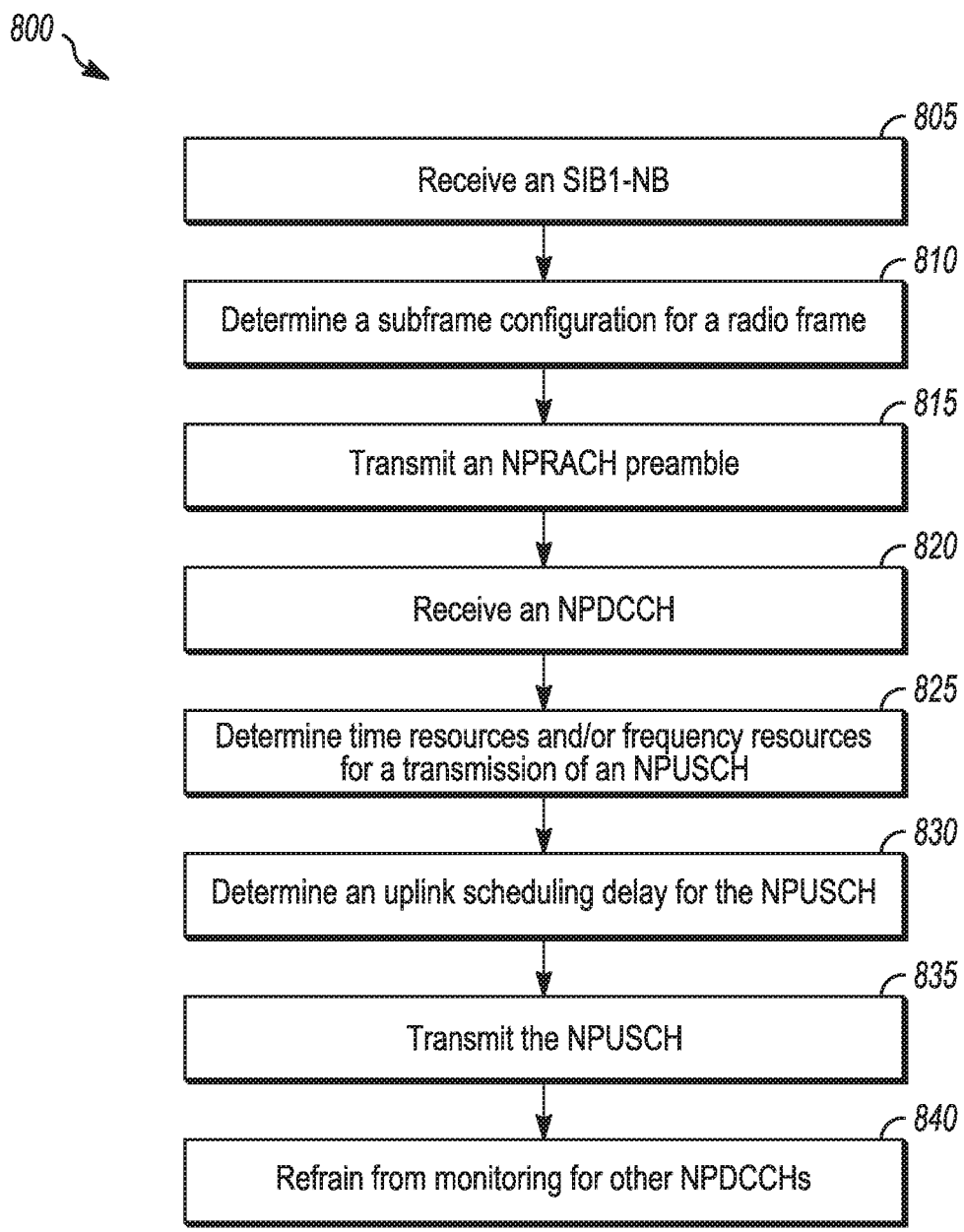
FIG. 8 illustrates the operation of a method of communication in accordance with some embodiments.
Figure 9:
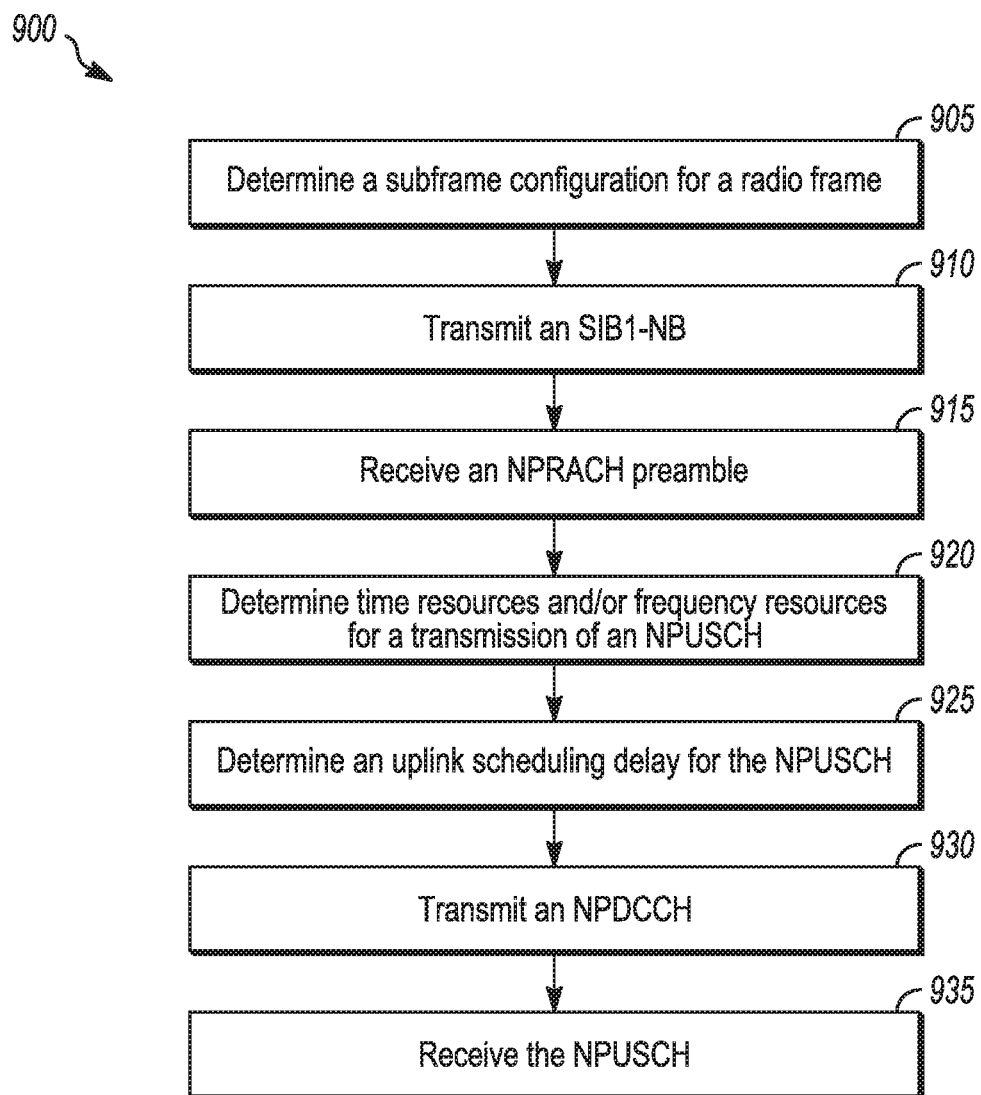
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. In describing the methods 800 and 900, reference may be made to one or more of FIGS. 1-13, although it is understood that the methods 800 and 900 may be practiced with any other suitable systems, interfaces and components. In some cases, descriptions herein of one or more of the concepts, operations and/or techniques regarding one of the methods described herein (800, 900 and/or other) may be applicable to at least one of the other methods described herein (800, 900 and/or other).

Some embodiments of the method 800 may include additional operations in comparison to what is illustrated in FIG. 8, including but not limited to operations described herein. Some embodiments of the method 800 may not necessarily include all of the operations shown in FIG. 8. In addition, embodiments of the method 800 are not necessarily limited to the chronological order that is shown in FIG. 8. In some embodiments, a UE 102 may perform one or more operations of the method 800, but embodiments are not limited to performance of the method 800 and/or operations of it by the UE 102. Accordingly, although references may be made to performance of one or more operations of the method 800 by the UE 102 in descriptions herein, it is understood that the eNB 104, gNB 105 and/or other device may perform one or more operations that may be the same as, similar to and/or reciprocal to one or more of the operations of the method 800, in some embodiments. In some embodiments, the UE 102 may perform one or more operations that may be the same as, similar to and/or reciprocal to one or more of the operations of the method 800.

Some embodiments of the method 900 may include additional operations in comparison to what is illustrated in FIG. 9, including but not limited to operations described herein. Some embodiments of the method 900 may not necessarily include all of the operations shown in FIG. 9. In addition, embodiments of the method 900 are not necessarily limited to the chronological order that is shown in FIG.

9. In some embodiments, a gNB 105 may perform one or more operations of the method 900, but embodiments are not limited to performance of the method 900 and/or operations of it by the gNB 105. Accordingly, although references may be made to performance of one or more operations of the method 900 by the gNB 105 in descriptions herein, it is understood that the eNB 104, UE 102 and/or other device may perform one or more operations that may be the same as, similar to and/or reciprocal to one or more of the operations of the method 900, in some embodiments. In some embodiments, the gNB 105 may perform one or more operations that may be the same as, similar to and/or reciprocal to one or more of the operations of the method 900.

In some cases, operations and techniques described as part of the method 800 may be relevant to the method 900. In some cases, operations and techniques described as part of the method 900 may be relevant to the method 800. In addition, embodiments of the method 900 may include one or more operations that may be the same as, similar to or reciprocal to one or more operations of the method 800 (and/or other operation(s) described herein). For instance, an operation of the method 800 may include reception of an element (such as a frame, block, message and/or other) by the UE 102 and the method 900 may include transmission of a same or similar element by the gNB 105.

While the methods 800 and 900 and other methods described herein may refer to eNBs 104, gNBs 105 or UEs 102 operating in accordance with 3GPP standards, 5G standards, NR standards, feNB-IoT standards and/or other standards, embodiments of those methods are not limited to just those eNBs 104, gNBs 105 or UEs 102 and may also be practiced on other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 and other methods described herein may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the messages described herein may be included in a standard and/or protocol, including but not limited to Third Generation Partnership Project (3GPP), 3GPP Long Term Evolution (LTE), Fourth Generation (4G), Fifth Generation (5G), New Radio (NR), feNB-IoT and/or other. The scope of embodiments is not limited to usage of elements that are included in standards, however.

In some embodiments, the UE 102 may be arranged to operate in accordance with a further enhanced narrowband internet-of-things (feNB-IoT) protocol, although the scope of embodiments is not limited in this respect. In some embodiments, the gNB 105 may be arranged to operate in accordance with a further enhanced narrowband internet-of-things (feNB-IoT) protocol, although the scope of embodiments is not limited in this respect.

At operation 805, the UE 102 may receive a system information block type-1 narrowband (SIB1-NB). In some embodiments, the SIB1-NB may indicate a subframe configuration for a radio frame configured for time-division duplexing (TDD) operation. In some embodiments, the radio frame may include subframes. The subframes may include one or more uplink subframes, one or more downlink subframes and/or one or more special subframes. In some embodiments, the SIB1-NB may include configuration information, in addition to or instead of the subframe configuration. The SIB1-NB may be included in a 3GPP protocol, an feNB-IoT protocol and/or other protocol, in some embodiments. It should be noted that embodiments are not limited to usage of the SIB1-NB in this operation and/or other operations described herein, as any suitable element may be used.

In some embodiments, the subframe configuration may comprise: one or more downlink subframes, one or more uplink subframes, and one or more special subframes. In some embodiments, each of the special subframes may occur immediately after one of the downlink subframes and immediately before one of the uplink subframes. In some embodiments, at least one of the special subframes may occur immediately after one of the downlink subframes and immediately before one of the uplink subframes. In some embodiments, uplink subframes may be allocated for uplink transmissions, the downlink subframes may be allocated for downlink transmissions, and the special subframe may be allocated to enable a transition between the downlink transmissions and the uplink transmissions.

At operation 810, the UE 102 may determine the subframe configuration for the radio frame. In some embodiments, the subframe configuration for the radio frame may be determined based on the SIB1-NB. For instance, an indicator in the SIB1-NB and/or a parameter in the SIB1-NB may be used, by the UE 102, to determine the subframe configuration. The scope of embodiments is not limited to usage of the SIB1-NB in this operation. The UE 102 may use other messages and/or other techniques to determine the subframe configuration, in some embodiments.

At operation 815, the UE 102 may transmit a narrowband physical downlink random access channel (NPRACH) preamble. In some embodiments, the NPRACH preamble may be mapped to multiple symbol groups. In some embodiments, each symbol group may include contiguous symbol periods and a cyclic prefix (CP) portion. In some embodiments, one or more of the symbol groups may include contiguous symbol periods and the CP portion. In a non-limiting example, a number of symbol periods per symbol group may depend at least partly on a number of contiguous uplink subframes in the subframe configuration.

In some embodiments, the UE 102 may select, from candidate NPRACH formats, an NPRACH format that includes a number of symbol groups per NPRACH preamble and further includes the number of symbol periods per symbol group. Example candidate NPRACH formats are given below. In some embodiments, one or more of the example candidate NPRACH formats may be used. In some embodiments, one or more additional candidate NPRACH formats may be used.

In an example candidate NPRACH format, the NPRACH preamble may be mapped to two symbol groups. In another example candidate NPRACH format, the NPRACH preamble may be mapped to four symbol groups. In another example candidate NPRACH format, the NPRACH preamble may be mapped to six symbol groups. Embodiments are not limited to the numbers of symbol groups given in the example candidate NPRACH formats above. The NPRACH preamble may be mapped to any suitable number of symbol groups.

In some embodiments, the UE 102 may transmit the NPRACH in accordance with frequency hopping between symbol groups.

At operation 820, the UE 102 may receive an NPDCCH. In some embodiments, the NPDCCH may include information related to a transmission, by the UE 102, of an NPUSCH in one or more radio frames. At operation 825, the UE 102 may determine time resources and/or frequency resources for the transmission of the NPUSCH. At operation 830, the UE 102 may determine an uplink scheduling delay based at least partly on information included in the NPDCCH. At operation 835, the UE 102 may transmit the NPUSCH. At operation 840, the UE 102 may refrain from monitoring for other NPDCCHs.

In some embodiments, the NPDCCH may indicate information related to the transmission of the NPUSCH. In some embodiments, the NPDCCH may schedule the transmission of the NPUSCH. In some embodiments, the NPDCCH may indicate one or more of: time resources for the transmission of the NPUSCH, frequency resources for the transmission of the NPUSCH, an uplink scheduling parameter and/or other information. In some embodiments, the uplink scheduling parameter may indicate a number of uplink subframes to be used, by the UE 102, to determine the uplink scheduling delay. In some embodiments, the NPDCCH may indicate a number of uplink subframes for an uplink scheduling delay for the transmission of the NPUSCH.

In some embodiments, an uplink scheduling delay for the transmission of the NPUSCH may be based on a sum of a predetermined first number of subframes and a variable second number of subframes. The second number of subframes may be based on a window of variable size. The window may start when the first number of subframes has elapsed since reception of the NPDCCH. The window may end when a number of uplink subframes has elapsed since the start of the window. In a non-limiting example, the number of uplink subframes (related to the end of the window as described above) may be indicated by an uplink scheduling parameter included in the NPDCCH. In some embodiments, the window may include: the number of uplink subframes indicated by the uplink scheduling parameter, and a variable number of downlink subframes that depends on a starting subframe index of the window within the one or more radio frames.

In some embodiments, the uplink scheduling delay may be based on an earliest subframe after: a predetermined number of subframes has elapsed with respect to a subframe of the NPDCCH, and a window of subframes has elapsed after the predetermined number of subframes, wherein a number of uplink subframes in the window is equal to the number of uplink subframes indicated by the NPDCCH.

In a non-limiting example, the NPUSCH may be a type-1 NPUSCH based on data bits. The first number of subframes may be 8, and the number of uplink subframes indicated by the uplink scheduling parameter may be one of: 0, 8, 16, and 32. In another non-limiting example, the NPUSCH may be a type-2 NPUSCH based on control bits. The first number of subframes may be 12. The number of uplink subframes indicated by the uplink scheduling parameter may be one of: 0, 8, 16, and 32. Embodiments are not limited to the example numbers given above. Embodiments are also not limited to the numbers used for the types (type-1 and/or type-2) of NPUSCH given above.

In some embodiments, the NPUSCH may be transmitted in accordance with: a single-tone transmission in one subcarrier per symbol period, or a multi-tone transmission in 3, 6, or 12 subcarriers per symbol period.

In some embodiments, the UE 102 may determine a transmission window for the transmission of the NPUSCH. In a non-limiting example, if the transmission window includes one or more downlink subframes, the UE 102 may refrain from monitoring for other NPDCCHs during the downlink subframes of the transmission. In another non-limiting example, if the transmission window includes one or more downlink subframes, and if the NPUSCH is a type-2 NPUSCH for transmission of hybrid automatic repeat request (HARQ) feedback, the UE 102 may refrain from monitoring for other NPDCCHs during the downlink subframes of the transmission window.

In some embodiments, the UE 102 may transmit the NPUSCH in accordance with the uplink scheduling delay. For instance, the UE 102 may transmit the NPUSCH after the uplink scheduling delay has elapsed. In some embodiments, the UE 102 may transmit the NPUSCH in accordance with the determined window for the transmission of the NPUSCH.

In some embodiments, if the UE 102 is configured for two hybrid automatic repeat request (HARQ) processes for multiple NPDSCHs, the UE 102 may refrain from monitoring for other NPDCCHs in a window, wherein: the second window starts two milliseconds before an earliest type-2 NPUSCH scheduled for HARQ feedback, and/or the second window ends after a latest type-1 NPUSCH scheduled for data transmission.

In some embodiments, the UE 102 may transmit the NPUSCH in accordance with a subcarrier spacing of 3.75 kilohertz (kHz) or 15 kHz. In some embodiments, if the NPUSCH is transmitted in accordance with the subcarrier spacing of 3.75 kHz, the candidate subframe configurations may be restricted to: a first candidate subframe configuration that includes a downlink subframe, followed by a special subframe, followed by two uplink subframes, followed by two other downlink subframes, followed by another special subframe, followed by two other uplink subframes, followed by another downlink subframe; and a second candidate subframe configuration that includes a downlink subframe, followed by a special subframe, followed by two uplink subframes, followed by six other downlink subframes. In some embodiments, if the NPUSCH is transmitted in accordance with the subcarrier spacing of 15 kHz, the candidate subframe configurations may include the first and second candidate subframe configurations and at least one other candidate subframe configuration.

In a non-limiting example, the UE 102 may encode the NPUSCH based on a maximum transport block size of 1000 bits or 2536 bits.

It should be noted that descriptions herein of some operations and/or techniques may refer to specific time resources and/or frequency resources (such as PRBs, symbol periods and/or sub-frames), but such references are not limiting. In some embodiments, other time resources and/or frequency resources may be used in one or more of those operations and/or techniques.

In some embodiments, an apparatus of a UE 102 may comprise memory. The memory may be configurable to store information identifying an uplink scheduling parameter. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the NPDCCH. The apparatus may include a transceiver to receive the NPDCCH. The transceiver may transmit and/or receive other blocks, messages and/or other elements.

At operation 905, the gNB 105 may determine a subframe configuration for a radio frame. At operation 910, the gNB 105 may transmit an SIB1-NB. At operation 915, the gNB 105 may receive an NPRACH preamble. At operation 920, the gNB 105 may determine time resources and/or frequency resources for a transmission of an NPUSCH. At operation 925, the gNB 105 may determine an uplink scheduling delay for the NPUSCH. At operation 930, the gNB 105 may transmit an NPDCCH. At operation 935, the gNB 105 may receive the NPUSCH. In some embodiments, the gNB 105 may monitor for the NPUSCH in accordance with the uplink scheduling delay.

Figure 10:
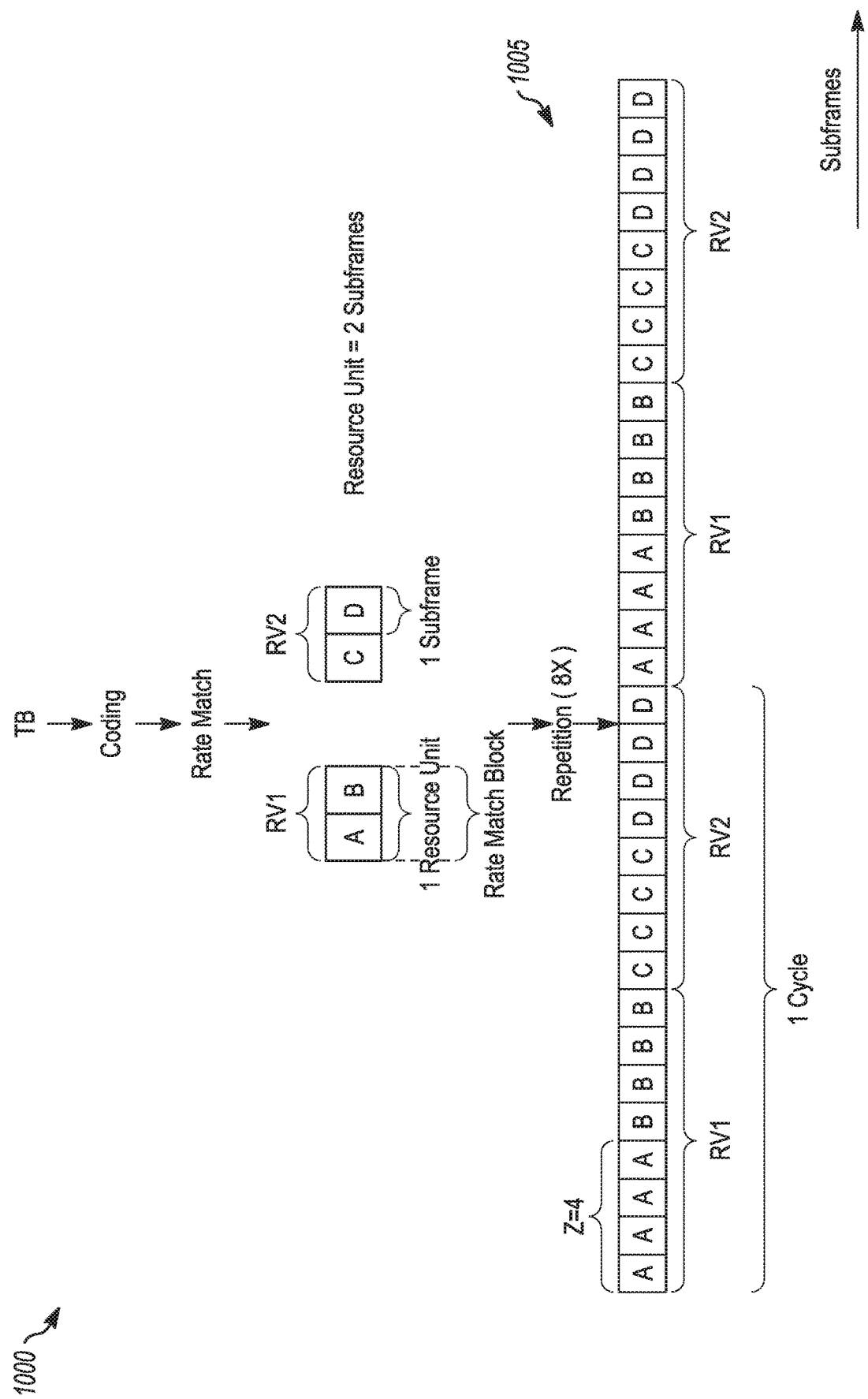
FIG. 10 illustrates an example repetition pattern in accordance with some embodiments.
Figure 11:
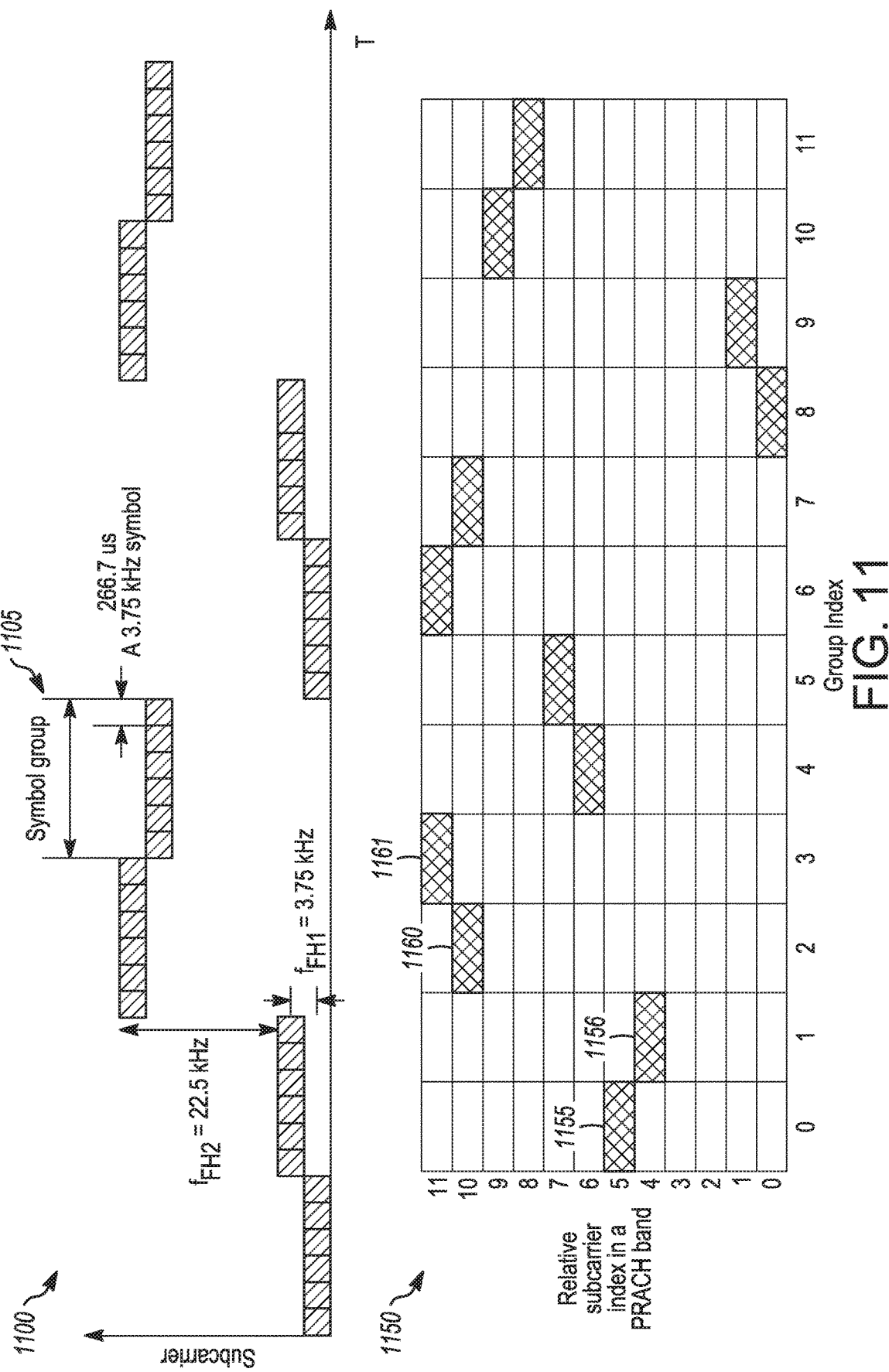
FIG. 11 illustrates an example of frequency hopping in accordance with some embodiments.
Figure 12:
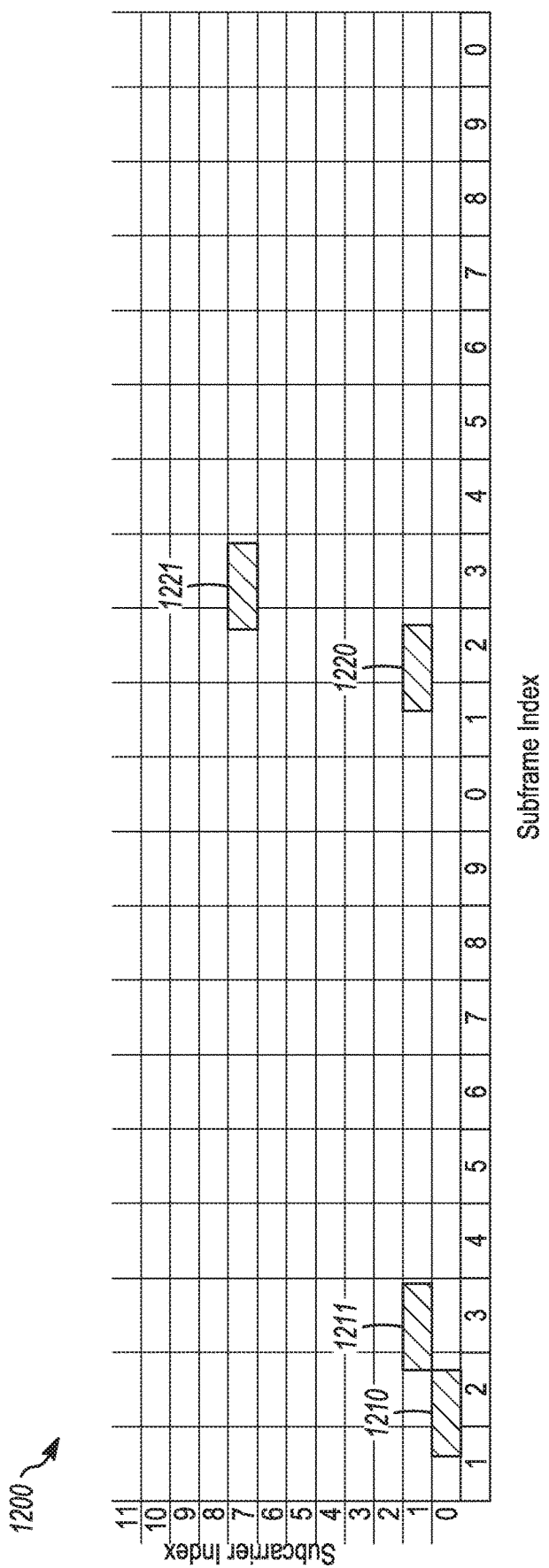
FIG. 12 illustrates another example of frequency hopping in accordance with some embodiments.
Figure 13:
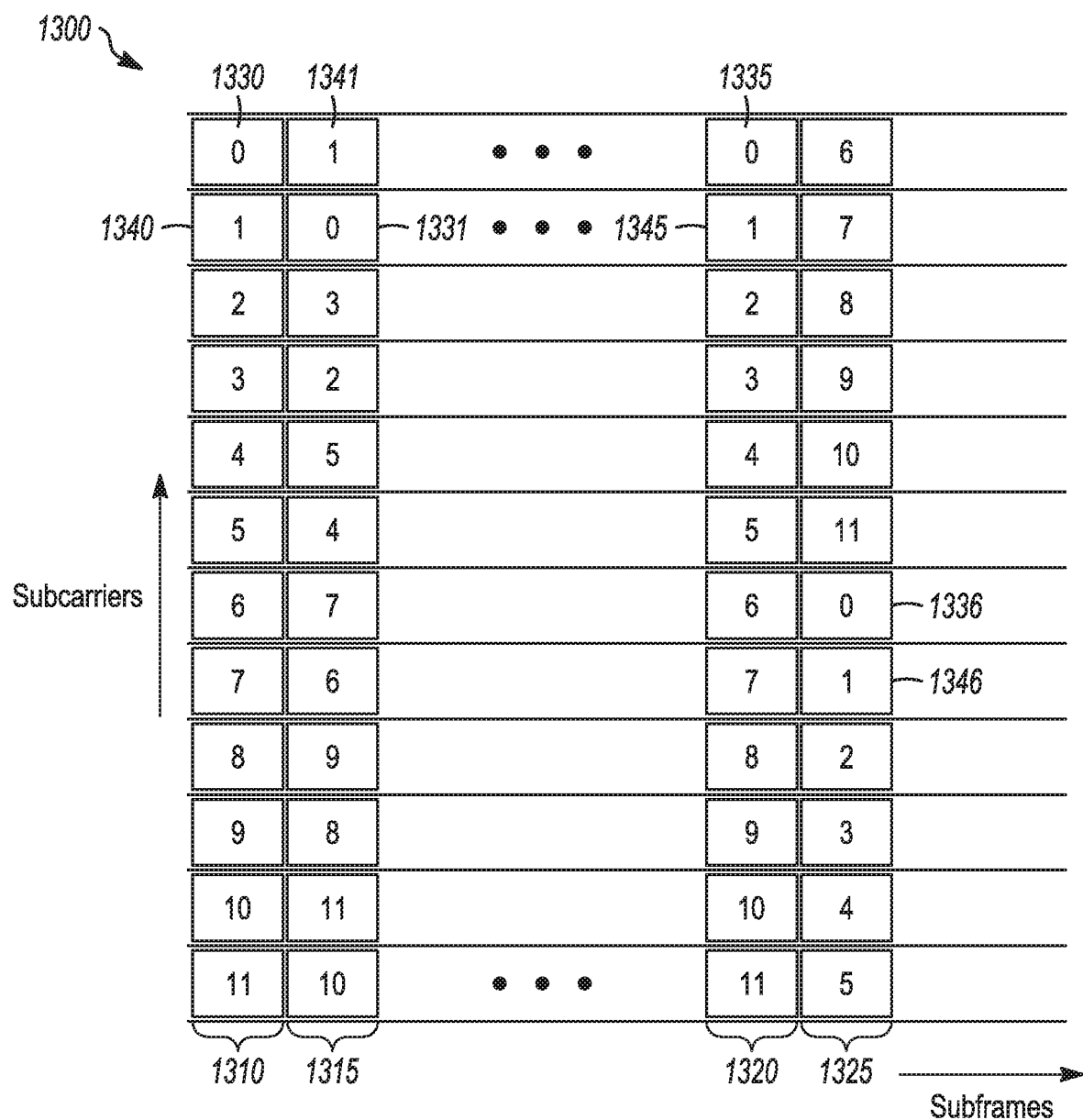
FIG. 13 illustrates another example of frequency hopping in accordance with some embodiments.

In some embodiments, an apparatus of a gNB 105 may comprise memory. The memory may be configurable to store at least a portion of the NPDCCH. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the NPDCCH. The apparatus may include a transceiver to transmit the NPDCCH. The transceiver may transmit and/or receive other blocks, messages and/or other elements FIG. 10 illustrates an example repetition pattern in accordance with some embodiments. FIG. 11 illustrates an example of frequency hopping in accordance with some embodiments. FIG. 12 illustrates another example of frequency hopping in accordance with some embodiments. FIG. 13 illustrates another example of frequency hopping in accordance with some embodiments. It should be noted that the examples shown in FIGS. 10-13 may illustrate some or all of the concepts and techniques described herein in some cases, but embodiments are not limited by the examples. For instance, embodiments are not limited by the name, number, type, size, ordering, arrangement and/or other aspects of the frames, subframes, signals, time resources, frequency resources and other elements as shown in FIGS. 10-13. Although some of the elements shown in the examples of FIGS. 10-13 may be included in a 3GPP LTE standard, 5G standard, NR standard, feNB-IoT standard and/or other standard, embodiments are not limited to usage of such elements that are included in standards.

In some embodiments, TDD for in-band, guard-band, and standalone operation modes of NB-IoT may be supported. In some cases, UL compensation gaps may not necessarily be needed or used by the UE 102, although the scope of embodiments is not limited in this respect. In some embodiments, new TDD configuration(s) other than the TDD configurations in LTE for further enhanced narrowband internet-of-things (feNB-IoT) may be supported.

In some embodiments, a TDD configuration in legacy LTE may be signaled by SIB1. One or more TDD configurations (including but not limited to one or more of the 7 TDD configurations shown in the table below) may be used in a legacy LTE protocol and/or other protocol.

| Uplink-downlink configur-ation | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In some embodiments, an NPUSCH for TDD feNB-IoT cells may be used. Two NPUSCH formats in LTE Rel-13 NB-IoT are NPUSCH format 1 for UL data and NPUSCH format 2 for A/N feedback on UL. For NPUSCH format 1, it is dynamically scheduled by NPDCCH, with 2 bits in DCI format N0 for indication of scheduling delay. Different from NPDSCH scheduling delay which only counts the valid DL subframes, the scheduling delay for NPUSCH indicates the absolute number of subframes. Two types of subcarrier spacing are supported for NPUSCH: 15 kHz and 3.75 kHz, where multi-tone transmissions use 15 kHz subcarrier spacing and single-tone transmissions use 15 kHz or 3.75 kHz. For 15 kHz subcarrier spacing, the slot and subframe definitions follow legacy LTE design. For 3.75 kHz subcarrier spacing, 2 ms NB-slot is defined, with each NB-slot comprised of 7 symbols. With 3.75 kHz subcarrier spacing, each symbol has duration of 275 us including a CP with length of 8.33 us. After 7 symbols and their CPs, 75 us duration is left as guard period for each NB-slot. Resource unit (RU) is defined as X ms, wherein X=1, 2, 4 and 8 for NPUSCH with subcarrier spacing of 15 kHz for 12, 6, 3 and 1 tone, respectively, and X=32 for single-tone NPUSCH with subcarrier spacing of 3.75 kHz. A single TB can be scheduled by multiple RUs for NPUSCH. QPSK is used for multi-tone NPUSCH format 1, while pi/2 BPSK and pi/4 QPSK can be used for single-tone NPUSCH format 1. Regarding the coding, the NPUSCH format 1 still uses convolutional Turbo coding, with 2 RVs supported. The repetition pattern is realized by using cyclic repetition, where in each cycle, each UL subframe/NB-slot in the allocated resources is repeated consecutively for Z times, with Z=min{4, indicated number of repetitions/2} for multi-tone NPUSCH and Z=1 for single-tone transmission. After one cycle of 1 RV, the other RV is used. The scenario 1000 in FIG. 10 illustrates an example repetition pattern 1005 for NPUSCH format 1.

An example of a TBS look up table is given below.

| $I_{TBS}$ | $I_{RU}$ |   |   |   |   |   |   |   |
|---|---|---|---|---|---|---|---|---|
|  | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 |  |
| 8 | 120 | 256 | 392 | 536 | 680 | 808 |  |  |
| 9 | 136 | 296 | 456 | 616 | 776 | 936 |  |  |
| 10 | 144 | 328 | 504 | 680 | 872 | 1000 |  |  |
| 11 | 176 | 376 | 584 | 776 | 1000 |  |  |  |
| 12 | 208 | 440 | 680 | 1000 |  |  |  |  |

For NPUSCH format 2, it carries 1-bit HARQ-ACK feedback. The repetition coding is used with no CRC attached. Only single-tone transmission is supported for NPUSCH format 2. The RU for NPUSCH format 2 is smaller than NPUSCH format 1: 2 ms for 15 kHz subcarrier spacing and 8 ms for 3.75 kHz subcarrier spacing. It has higher DMRS density than NPUSCH format 1. The modulation order supported for NPUSCH format 2 is only pi/2 BPSK. The frequency and time resources for NPUSCH format 2 transmission are indicated in the DCI scheduling the corresponding NPDSCH. The number of repetitions is semi-statically configured by RRC signaling.

In some embodiments, an NPUSCH format 1 for TDD feNB-IoT cells may be based at least partly on the LTE Rel-13 NB-IoT design. The scope of embodiments is not limited in this respect, however, as one or more techniques, operations and/or methods described herein may be applicable to embodiments that may not necessarily be based on the LTE Rel-13 NB-IoT design.

In some embodiments, both 15 kHz and 3.75 kHz subcarrier spacing can be supported. In some embodiments, a 15 kHz subcarrier spacing may be supported. One possible motivation for using such embodiments (with the 15 kHz spacing) may be that the number of valid UL subframes depends on the TDD configuration, and they are non-continuous. Thus, NPUSCH transmission with large number of subframes/NB-slots may result in large latency.

In some embodiments, both multi-tone and single-tone NPUSCH format 1 transmission may be supported. In some embodiments, multi-tone NPUSCH format 1 transmission may be supported. In some embodiments, different TDD configurations can support different sub-PRB NPUSCH and/or different subcarrier spacing. For example, the 3.75 kHz subcarrier spacing may be supported for one or more TDD configurations, including but not limited to TDD configurations 0, 1, 3, 4 and/or 6. The 4-tone NPUSCH (if supported) can be supported for TDD configurations 0, 3, and/or 6.

In some embodiments, NPUSCH transmissions with 15 kHz subcarrier spacing are supported in all supported UL/DL configurations for NB-IoT TDD. In some embodiments, 3.75 kHz subcarrier spacing is also supported, in UL/DL configurations #1, #4, with the same definition of NB-slot and resource unit as FDD.

In some embodiments, a supported number of subcarriers that can be allocated for sub-PRB NPUSCH transmission may be based at least partly on an LTE Rel-13 NB-IoT design. For instance, single-tone, 3-tone and/or 6-tone NPUSCH transmission may be used.

In some embodiments, for the NPUSCH transmissions with 15 kHz subcarrier spacing, both Multi-tone (3, 6, 12 subcarriers with RU lengths 4 ms, 2 ms, 1 ms) and single tone (with RU length 8 ms) transmissions are supported as in FDD NB-IoT for all the supported TDD configurations in TDD NB-IoT. In some embodiments, an RU length may be the same as an RU length used in FDD.

Alternatively, other sub-PRB NPUSCH allocations may be used. For example, 2-tone or 4-tone NPUSCH can be defined and supported in one or more TDD configurations, including but not limited to TDD configurations 0, 3 and/or 6.

In some embodiments, a repetition pattern may be different from Rel-13 NB-IoT in terms of different values of parameter Z. For example, Z can be determined by min{X, indicated number of repetitions/2} in TDD feNB-IoT cells, where X can be any integer, e.g. X=5 (similar to the eMTC design in CE mode B) for multi-tone NPUSCH format 1 transmission, and Z=1 for single-tone NPUSCH format 1 transmission (if supported).

In some embodiments, for the monitoring of NPDCCH during the DL subframes in the middle of a NPUSCH transmission, one or more of the following techniques may be used. In some embodiments, the UE 102 may not be required to monitor NPDCCH before the NPUSCH transmission is completed.

In some embodiments, the UE 102 may not be required to monitor certain DCI formats before the NPUSCH transmission is completed (for instance, the DCI format N0), while other DCI formats may need to be monitored. In some embodiments, the UE may continue monitoring the NPDCCH. For instance, for DCI format N0, in the middle of an on-going NPUSCH transmission, the scheduling delay between the end of DCI and the start of NPUSCH transmission may be large enough to allow the on-going NPUSCH transmission to be finished. Otherwise, the NPUSCH scheduled by the DCI may be transmitted in other frequency resources (for instance, other tones in the NB) different from the on-going NPUSCH transmission. It should be noted that in some cases, the performance may be degraded due to the non-continuous UL subframes in TDD systems.

In a non-limiting example, a number of repetitions supported can be one of {1, 2, 4, 8, 16, 32, 64, 128}. Those values may be the same as in LTE Rel-13, although the scope of embodiments is not limited to values from the LTE Rel-13 protocol. In some embodiments, values such as 256 and/or 384 can also be used. In a non-limiting example, the amount of supported number of repetitions may be one of {1, 2, 4, 8, 16, 32, 64, 128, 256, 384}. In a non-limiting example, the amount of supported number of repetitions may be one of {1, 2, 4, 8, 16, 32, 64, 128, 256, 384} with two elements excluded, where the two elements can be any numbers in the set (for instance, 1 and 384). In another non-limiting example, one or more additional values may be added to the values {1, 2, 4, 8, 16, 32, 64, 128, 256, 384}. In another non-limiting example, a subset of the values {1, 2, 4, 8, 16, 32, 64, 128, 256, 384} may be used. In another non-limiting example, a subset of the values {1, 2, 4, 8, 16, 32, 64, 128, 256, 384} and one or more additional values may be used.

In some embodiments, a supported maximum UL TBS can be reduced in comparison to TBS values used in other protocols (including but not limited to LTE Rel-13 NB-IoT and Rel-14 eNB-IoT). In a non-limiting example, a TBS table can be used, with at least some entries having smaller TBS than TBS value(s) used in another protocol. For example, the TBS values for certain resource allocation can be reduced to the integer closest to X multiplied by the TBS value in LTE Rel-13 NB-IoT or LTE Rel-14 eNB-IoT, wherein X can be any value within (0.1), e.g. 0.5, or ⅓.

In some embodiments, a TBS look up table can be punctured to support only up to $I_{RU}<=Y$, wherein Y can be any integer smaller than 7, e.g. Y=2, 3, or 4. The parameter Y can be predefined, or configured by RRC signaling. Before the indication of Y, a default value of Y can be predefined, for instance Y=7.

In some embodiments, a maximum UL TBS can be the same as in an LTE Rel-13 NB-IoT (that is, 1000 bits) or the same as in LTE Rel-14 eNB-IoT (that is, 2536 bits) depending on UE capability.

In some embodiments, maximum UL and DL TBS for Cat. NB1 and Cat. NB2 are kept the same as Rel-13/Rel-14 (e)NB-IoT FDD system.

Alternatively, a maximum UL TBS of 2536 may be supported in TDD feNB-IoT. In some embodiments, the maximum UL TBS can also be increased. In these embodiments, the achievable MCL can be relaxed (for instance, smaller than 164 dB).

In some embodiments, a DMRS density may be increased. In a non-limiting example, performance may be degraded due to one or more factors, such as the non-continuous valid UL subframes in TDD systems and/or other. To improve the performance, the DMRS density can be increased.

In some embodiments, an increased DMRS density may be used for all NPUSCH format 1 transmissions. In some embodiments, the increased DMRS density may be used for NPUSCH format 1 transmissions with number of repetitions larger than a certain value, denoted by Y. The parameter Y can be any integer, such as Y=16, 32, 64 and/or other. In some embodiments, the use of increased DMRS density may be configurable and may be indicated via the DCI scheduling the NPUSCH format 1 and/or may be configured via higher layer signaling when the number of NPUSCH repetitions is larger than a specified value. For instance, the DMRS density can be doubled, wherein the DMRS can be transmitted in symbols #2 and 4 in 0.5 ms slot for NPUSCH format 1 with 15 kHz subcarrier spacing, and can be transmitted in symbols #3 and #5 in 2 ms NB-slot for NPUSCH format 1 with 3.75 subcarrier spacing. Note that other examples are not precluded. In a non-limiting example, any N symbols out of every 7 symbols can be used for DMRS transmission, wherein N can be any integer, such as N=2, 3 and/or other.

In some embodiments, the DMRS sequences may be the same as or similar to the DMRS sequences used for LTE Rel-13 NB-IoT, although the scope of embodiments is not limited in this respect.

In some embodiments, for transmission of NPUSCH format 1, the valid UL subframe(s) may be defined as the subframes that can be used for NB-IoT systems and are configured as UL subframes based on the TDD configuration. The valid UL subframes can be indicated by MIB or SIB1-NB, or other system information.

In some embodiments, all UL subframes according to the indicated TDD configuration can be assumed as valid NB-IoT UL subframes without any additional configuration. When the scheduled NPUSCH occurs on the invalid UL subframe (for instance, on the DL subframe according to TDD configuration), the NPUSCH transmission may be postponed to the next valid UL subframe.

Regarding the scheduling delay, one or more of the following techniques and/or other techniques may be used.

In some embodiments, the scheduling delay can indicate an absolute number of subframes. The NPUSCH may be transmitted in the first valid UL subframe after the scheduling delay. In a non-limiting example, new values of the scheduling delay can be introduced. For example, to take into account the DL subframes between the UL grant and scheduled NPUSCH transmission, a larger scheduling delay can be supported. Instead of the legacy values {8, 16, 32, 64} in LTE Rel-13 NB-IoT, the scheduling delay can be {16, 32, 64, 96} or {16, 32, 64, 128} in TDD systems.

In another non-limiting example, the scheduling delay can have finer granularity, which may enable support of more flexible UL scheduling in some cases. For example, any one or multiple values {12, 24, 48, 96, 128} can be added to the supported scheduling delay. One or more of the following options and/or other options can be used for the indication of scheduling delay. In option #1, more bits can be used for the indication of scheduling delay. For example, with 3 bits in the field for scheduling delay indication, the potential scheduling delay can be {8, 12, 16, 24, 32, 48, 64, 128}. In option #2, there can be multiple sets of scheduling delays, and RRC signaling may indicate which set to be used, either cell specifically or UE specifically. There can still be 4 candidate values in each set of the scheduling delay, and 2 bits in DCI can be used for the indication, similar as in LTE Rel-13 NB-IoT. Alternatively, more bits can be used in DCI if the number of candidates in each configured set is more than 4. A set of default values can be predefined, e.g. {8, 16, 32, 64}. In option #3, there can be multiple sets of scheduling delays, and which set to be used may be a function of 0, number of scheduled repetitions for NPUSCH/NPDSCH, a max number of repetitions that can be scheduled for the NPUSCH/NPDSCH and/or other factor(s). There can still be 4 candidate values in each set of the scheduling delay, and 2 bits in DCI can be used for the indication, similar as in LTE Rel-13 NB-IoT. Alternatively, more bits can be used in DCI if the number of candidates in each configured set is more than 4.

In some embodiments, the scheduling delay takes into account the valid UL subframes in the feNB-IoT TDD cell. In some embodiments, the scheduling delay only takes into account the valid UL subframes in the feNB-IoT TDD cell.

In some embodiments, the HARQ of NPUSCH format 1 in TDD cells can be asynchronous and/or adaptive. In other words, the HARQ process number (if more than 1 HARQ process is supported), and new or retransmission may be indicated by NPDCCH dynamically. In some embodiments, following LTE Rel-13 and LTE Rel-14 (e)NB-IoT, UEs 102 may support 1 HARQ process or 2 HARQ processes. Alternatively, UEs 102 may support more than 2 HARQ processes for DL and UL, depending on their capability. As one example, the maximum number of HARQ processes may depend on not only the UE capability but also the TDD configurations, a minimum number of HARQ processes depending on UE 102 capability, a maximum number of HARQ processes in the considered TDD configuration and/or other factor(s). In some embodiments, the maximum number of HARQ processes in the considered TDD configuration can be the same as in legacy LTE TDD systems, or the number of HARQ processes that can be supported by eMTC TDD systems, although the scope of embodiments is not limited in this respect.

In some embodiments, an NPUSCH format 2 for TDD feNB-IoT cells may be used. One or more techniques may be the same as or similar to one or more techniques used for LTE Rel-13 NB-IoT design, although the scope of embodiments is not limited in this respect.

In some embodiments, both 15 kHz and 3.75 kHz subcarrier spacing can be supported as in LTE Rel-13 NB-IoT. In some embodiments, only a 15 kHz subcarrier spacing may be supported. In some embodiments, different TDD configurations can support different numerology for certain physical signals or channels, including but not limited to NPUSCH format 1 and/or NPUSCH format 2. In a non-limiting example, one or more TDD configurations with 2 consecutive UL subframes (for instance, TDD configurations 0, 1, 3, 4 and/or 6) can support 3.75 kHz NPUSCH format 2 and/or NPUSCH format 1. In another non-limiting example, only TDD configurations with 2 consecutive UL subframes (for instance, TDD configurations 0, 1, 3, 4 and/or 6) can support 3.75 kHz NPUSCH format 2 and/or NPUSCH format 1.

In some cases, performance may be degraded due to the non-continuous UL subframes in TDD systems.

In some embodiments, a number of repetitions supported can be one of {1, 2, 4, 8, 16, 32, 64, 128}. This may be similar to or the same as a number of repetitions supported in LTE Rel-13, although the scope of embodiments is not limited in this respect. In some embodiments, a target MCL may be reduced. In some embodiments, a number of repetitions can be increased. For example, 256 and/or 384 can be introduced. In some embodiments, an indication of the number of repetitions for NPUSCH format 2 may be similar to an indication used in LTE Rel-13 NB-IoT (including but not limited to indication by higher layer signaling). In a non-limiting example, an amount of supported number of repetitions may be one of {1, 2, 4, 8, 16, 32, 64, 128, 256, 384}. In another non-limiting example, an amount of supported number of repetitions may be one of {1, 2, 4, 8, 16, 32, 64, 128, 256, 384} with two elements excluded, where the two elements can be any numbers in the set (for instance, 1 and 384). In another non-limiting example, new values can be added to existing set, e.g. {1, 2, 4, 8, 16, 32, 64, 128, 256, 384}. Embodiments are not limited to these example numbers. Additional values and/or different values may be used, in some embodiments.

In some embodiments, when the NPUSCH format 2 transmission occurs on an invalid UL subframe (for instance, on a DL subframe according to TDD configuration), the NPUSCH transmission may be postponed to the next valid UL subframe.

Regarding the time offset indicated by the DCI scheduling the corresponding NPDSCH transmission, one or more of the following techniques and/or additional technique(s) may be used. In some embodiments, a time offset may indicate an absolute number of subframes. The NPUSCH may be transmitted in the first valid UL subframe after the offset. In a non-limiting example, new values (in addition to or instead of one or more values used in a legacy LTE protocol) of the timing offset can be used. For example, to take into account the DL subframes between the end of the NPDSCH and beginning of the HARQ-ACK transmission, a larger time offset can be supported. Instead of the legacy values {0, 2, 4, 5} msec for 15 kHz subcarrier spacing and {0, 8} msec for 3.75 kHz subcarrier spacing in LTE Rel-13 NB-IoT, the supported set of time offsets can be a subset of {0, 2, 4, 5, T1} or {0, 8, T2} in TDD systems, where T1 and T2 can be predefined to any positive integer, (including but not limited to T1=7 and T2=16). Alternatively, the number of bits used for the indication of time offset can be the same as or similar to a number used in LTE Rel-13 NB-IoT, and thus there may be 4 time offset values for 15 kHz subcarrier spacing and 2 time offset values for 3.75 kHz subcarrier spacing, wherein the set of offsets can be any subset of {0, 2, 4, 5, T1} with 4 elements (for example, {0, 2, 4, T1}), or a subset of {0, 8, T2} with 2 elements (for example, {0, T2}, or {8, T2}). Embodiments are not limited to the example values given above.

In some embodiments, the time offset may take into account the valid UL subframes in the feNB-IoT TDD cell. In some embodiments, HARQ-ACK bundling/multiplexing may be supported. One or more of the following techniques and/or other technique(s) may be used for time resource indication of NPUSCH format 2. In a non-limiting example, a range of time offset values can be defined. For example, two different sets of time offsets can be defined, with one for UEs supporting only 1 HARQ process or for UEs 102 that are not configured with HARQ-ACK bundling/multiplexing, and the other for UEs 102 configured with HARQ-ACK bundling/multiplexing. The former set of time offsets can be designed as above embodiments. The latter set of time offsets can contain larger values, such as a subset of {0, 2, 4, 5, 16, 32, 64, 128} for 15 kHz subcarrier spacing and/or {0, 8, 16, 32, 64, 128, 256} msec for 3.75 kHz subcarrier spacing. Embodiments are not limited to the example values given above.

In another non-limiting example, a one-bit counter (which may be the same as and/or similar to a DAI in legacy LTE) may be introduced to indicate whether the current DCI is the last one within the bundling/multiplexing window or not. The time offset indication field can be ignored if the current DCI is not the last one within the bundling/multiplexing window, or the last DCI can overwrite the time offset indicated by the previous DCI.

In some embodiments, HARQ-ACK bundling/multiplexing for Cat NB2 UEs supporting 2 or more than 2 HARQ processes may be used. In LTE Rel-14 eNB-IoT, up to 2 HARQ processes may be supported. For UEs 102 supporting N HARQ processes with N>=2, HARQ-ACK bundling/multiplexing can be supported. The UE 102 may indicate its capability for the support of HARQ-ACK bundling/multiplexing via legacy capability signaling method. Depending on the UE capability, the eNB 104 may indicate the use of HARQ-ACK bundling/multiplexing via higher layer signaling.

One or more of the following techniques and/or additional technique(s) may be used for HARQ-ACK bundling/multiplexing. In some embodiments, for UEs 102 supporting N DL HARQ processes, the UEs 102 may feedback a bitmap with length of N in NPUSCH format 2 transmission, each bit for one DL HARQ process. In one example of this embodiment, higher order modulation, including but not limited to pi/4 QPSK, may be used. In some embodiments, for UEs 102 supporting N DL HARQ processes, the HARQ-ACK feedback for these N HARQ processes can be bundled. For example, when all M HARQ processes have ACK feedback, the NPUSCH format 2 may carry ACK, otherwise, the NPUSCH format 2 may carry NACK, where M is a positive integer no more than N. The determination of M may depend on the bundling configuration. The bundling configuration can be indicated by RRC signaling and/or DCI. The indication information can include the number of HARQ processes to be bundled, the index of current HARQ processes in this bundle, the bundle index and/or the HARQ process index in current bundle. Any suitable technique may be used for the bundling configuration indication. For instance, the DCI may include the indication of time offset for HARQ-ACK feedback, the bundling on/off, the number of TBs in the HARQ-ACK bundle and/or other information.

In some embodiments, for UEs 102 supporting N DL HARQ processes, the HARQ-ACK feedback for 2 HARQ processes out of N can be multiplexed, by applying a scrambling sequence to carry the additional 1 bit. The scrambling sequence can be any binary sequence, e.g. a Zadoff-Chu (ZC) sequence, Hadamard sequence, or pseudo noise sequence. The sequences for ACK and NACK may have low cross-correlation. For example, two orthogonal sequence, e.g. a ZC sequence with different cyclic shifts or two orthogonal Hadamard sequences can be used. In a non-limiting example, the DMRS sequence can follow LTE Rel-13 NB-IoT. Alternatively, different DMRS sequences or same sequence with different covering codes can be used for cases with ACK and with NACK.

In some embodiments, for UEs 102 supporting N DL HARQ processes, the HARQ-ACK feedback for 2 HARQ processes out of N can be multiplexed by channel selection. For instance, two subcarriers can be reserved for the HARQ-ACK feedback transmission, with one corresponding to ACK and the other corresponding to NACK for the $2^{nd}$ HARQ process. In a non-limiting example, both these two subcarriers can be indicated by DCI. In another non-limiting example, one of them is indicated by DCI while the other subcarrier can be determined based on the indicated subcarrier plus an offset. The offset can be predefined or indicated by higher layer signaling, in some embodiments.

In some embodiments, HARQ-ACK bundling may be enabled when there is no repetitions for NPDSCH transmission, or the number of repetitions scheduled for NPDSCH is no more than R, wherein R may be a predefined/configured positive integer. In a non-limiting example, when the HARQ-ACK feedbacks start from the same subframe, the HARQ bundling or multiplex as disclosed above may be used. In another non-limiting example, the bundling/multiplexing can be configured by higher layer signaling. Once configured, in one example, the time offset indicated by the DCIs scheduling the NPDSCH corresponding to the bundled/multiplexed HARQ-ACK may ensure that they result in the same subframe(s) for HARQ-ACK transmission. Alternatively, the later DCI can overwrite the first DCI indication for the HARQ-ACK resources.

In some embodiments, if there is no additional DCI received before the transmission of HARQ-ACK feedback indicated by the first Kth DCI, the UE 102 may assume that the remaining DCIs in the configured bundle (if there is a bundle configured with more than K HARQ processes) are missed. The UE 102 may not transmit HARQ-ACK feedback in this case (for example, when HARQ-ACK bundling is used), or feedback the HARQ-ACK in the resources indicated by the first K DCIs (for example, when HARQ-ACK multiplexing or HARQ-ACK bitmap is used).

In some embodiments, an NPUSCH may be used in TDD feNB-IoT. In some embodiments, a subcarrier spacing of NPUSCH for TDD feNB-IoT can be 15 kHz, and/or 3.75 kHz. In some embodiments, an NPUSCH format 1 for TDD feNB-IoT can support: single-tone and multi-tone transmissions; or multi-tone transmission. In some embodiments, a repetition pattern for NPUSCH format 1 can follow FDD feNB-IoT, or a parameter Z can be different, (for instance, Z=1 for single-tone transmission, and/or Z=5 for multi-tone transmission). In some embodiments, repetition numbers can be the same as FDD feNB-IoT, or can be increased. In some embodiments, the TBS can be the same as Rel-14 eNB-IoT, or be reduced, or be mapped to more resources. In some embodiments, a DMRS density can be increased. In some embodiments, a scheduling delay for NPUSCH format 1 and/or time offset for NPUSCH format 2 can be increased, or be finer. In some embodiments, HARQ-ACK bundling or multiplexing can be supported for NPUSCH format 2. In some embodiments, different TDD configurations can support different sub-PRB NPUSCH (for instance, in terms of supported number of tones, subcarrier spacing and/or other).

In some embodiments, NPRACH may be a single-tone transmission with 3.75 kHz subcarrier spacing. The NPRACH symbol duration is 266.7 us. In some embodiments, there may be two CP lengths supported for different cell radius: 66.7 and 266.7 us. The frequency hopping of NPRACH may occur between groups of symbols. In an example 1100 shown in FIG. 11, a symbol group 1105 includes one CP and five identical symbols of value equal to 1. The duration of one symbol group may be 1.4 ms for CP of 66.7 us and 1.6 ms for CP of 266.7 us. Regarding the frequency hopping scheme for NPRACH, there are two frequency hopping levels, as illustrated in the example 1150 in FIG. 11. The first level hopping may be single-subcarrier hopping between 1st/2nd and 3rd/4th symbol groups (such as 1155, 1156 for 1st/2nd and 1160, 1161 for 3rd/4th in the example 1150). A second level hopping may be 6-subcarrier hopping between 2nd/3rd symbol groups (such as 1156, 1160 in the example 1150). Pseudo-random hopping may be used every 4 symbol groups. The supported number of NPRACH repetitions may be {1, 2, 4, 8, 16, 32, 64, 128}, with repetition unit of NPRACH symbol group or NPRACH preamble. The repetitions of NPRACH are transmitted back-to-back in the contiguous-in-time subframes in the UL NB-IoT carrier within one period for NPRACH.

In some embodiments, in TDD systems, the number of contiguous-in-time UL subframes may be limited. Thus, the direct application of NPRACH design in Rel-13 NB-IoT may result in non-continuous NPRACH transmission, especially with large number of repetitions. For example, even for configurations with most UL subframes in legacy LTE, which have 1 special subframe followed by 3 UL subframes (e.g. existing TDD configuration 0), the continuous UL subframes may accommodate only up to 2 NPRACH symbol group repetitions. In some embodiments, an NPRACH design for the TDD feNB-IoT cells with a limitation on number of continuous UL subframes may be used.

In some embodiments, NPRACH in TDD feNB-IoT cells may be based on a subcarrier spacing of 3.75 kHz, including but not limited to techniques used in an LTE Rel-13 protocol. In some embodiments, NPRACH in TDD feNB-IoT cell may be based on a subcarrier spacing of 1.25 kHz or 7.5 kHz, including but not limited to techniques used in a legacy LTE protocol.

In some embodiments, the NPRACH may use a subcarrier spacing of 3.75 kHz. In some embodiments, the NPRACH may be based at least partly on an LTE Rel-13 NB-IoT design and may further be based on one or more of the techniques described below. However, embodiments are not limited to NPRACHs that are based on the LTE Rel-13 NB-IoT design or any other NPRACH designs. In addition, descriptions herein may refer to specific values for one or more parameters (such as the subcarrier spacing and/or other). Embodiments are not limited to those values, however. One or more of the techniques, operations and/or methods described herein may be applicable to cases in which different values are used.

In some embodiments, the NPRACH transmission may be non-continuous, wherein the NPRACH transmission may be postponed in invalid UL subframes. The symbol group definition may be based on one CP in addition to five symbols (which may be similar to technique(s) of LTE Rel-13 NB-IoT, although the scope of embodiments is not limited in this respect. A number of repetitions may be in units of NPRACH symbol group. It may be up to eNB 104 implementation to avoid the collision between two set of NPRACH resources. A scrambling sequence may be used if NPRACH sequence design follow Rel-13 NB-IoT, in order to facilitate the timing estimation. For example, length-3 Hadamard sequence or ZC sequence may be used, with the CP and first symbol using the 1 element of the sequence, the $2^{nd}$ and $3^{rd}$ symbols using the $2^{nd}$ element of the sequence, and the $4^{th}$ and $5^{th}$ symbols using the $3^{rd}$ element of the sequence.

In some embodiments, each symbol group may be transmitted in continuous UL subframes, while different sets of symbol groups may be transmitted in different set of UL subframes which may be non-continuous. In a non-limiting example of such an embodiment, the symbol group may be defined as in Rel-13 NB-IoT. For TDD configurations with limited number of UL subframes, the remaining part of the NPRACH symbol group may be punctured. For example, with existing TDD configuration 5 having 1 special subframe followed by 1 UL subframe, the NPRACH may start from the UpPTS and continue until the end of the following UL subframe, or alternatively the NPRACH may be transmitted on the one UL subframe. Recall that the NPRACH symbol group in Rel-13 NB-IoT has duration of 1.4 ms or 1.6 ms depending on the CP length, which cannot fit in the duration of 1 UL subframe or 1 UpPTS+1 UL subframe. The remaining part of the NPRACH symbol group may be punctured. It should be noted that the above example may also be applicable to other TDD configurations with more continuous UL subframes, but with limited number of continuous UL subframes configured for NPRACH transmission (for instance, 1 or 2 or other), in some cases.

In another non-limiting example of such an embodiments, the symbol group may be different from Rel-13 NB-IoT. For example, each symbol group may have N symbols, where N may be a positive integer such as 1, 2, 3 or 4. With N=3, the duration of symbol group may be 867 us and 1.1 ms depending on CP length, which may fit into 1 UL subframe and 1 UpPTS (for instance, including 2 UL symbols)+1 UL subframe, respectively. With N=4, the duration of symbol group may be 1.13 ms and 1.33 ms depending on the CP length, which may fit into 1 UpPTS+1 UL subframe and 2 UL subframes, respectively. With N<=2, the duration of symbol group may be less than 1 ms and may fit into 1 UL subframe. In TDD configurations 2 and 5, there may be only 1 UL subframe per 5 ms. The symbol group with N=1 may be used, and two symbol groups may be fitted into 1 UL subframe. To have the CP duration and guard time almost the same, the CP duration may be reduced to 155.5 us and the remaining time after transmission of two symbol groups may be used as guard time. The value of N may be either predefined, or be configurable via higher layer signaling. For the latter case, the higher layer signaling may directly indicate the value of N, or may indicate the number of continuous UL subframes used for NPRACH transmission and the N may be the maximal integer satisfying the symbol group duration no more than the configured number of continuous UL subframes for NPRACH transmission.

In some embodiments, a scrambling sequence may be used if NPRACH sequence design follow Rel-13 NB-IoT, in order to facilitate the timing estimation. In one example, the length of the scrambling sequence may depend on the number of symbols in the symbol group. In a non-limiting example, the length may be floor((N+1)/2), where N may be the number of symbols in the symbol group. Similar equations and/or other equations may be used, in some embodiments.

In some embodiments, a certain number of symbol groups may be transmitted in continuous UL subframes. The symbol group may have different definitions from Rel-13 NB-IoT. For example, the symbol group may include 1 CP and N symbols, with N being a positive integer such as 2, 3 or 4. In cases with 2 continuous UL subframes, up to 2 repetitions of symbol group with CP length of 66.7 us and 3 NPRACH symbols may be configured.

In another non-limiting example, there may be two symbol groups with N=2 and CP=266.7 us transmitted over 2 contiguous-in-time UL subframes. Alternatively, there may be two symbol groups with N=3 and CP=133.3 us transmitted over 2 contiguous-in-time UL subframes. The NPRACH transmission may start from the subframe boundary (that is, the start of first UL subframe), and the remaining time may be left as guard time. In cases with 1 UpPTS followed by 2 continuous UL subframes, up to two symbol groups may be configured, where each symbol group may comprise of one CP of 66.7 us or 266.7 us and up to 3 NPRACH symbols. The CP length may be adjusted to ensure sufficient guard time after the NPRACH transmission.

In a non-limiting example, a scrambling sequence may be used. For example, the length of the scrambling sequence may depend on the number of symbols in the symbol group. For instance, a length of floor(M*(N+1)/2) may be used in cases in which the CP has the length same as NPRACH symbol duration, wherein N may be the number of symbols in the symbol group and M may be an integer that is no more than the number of symbol groups that are transmitted over continuous UL subframes. In another non-limiting example, frequency hopping similar to Rel-13 NPRACH design may be used.

In some embodiments, different NPRACH formats may be defined, and may be used for different TDD configurations. For instance, TDD configurations 2 and 5 may have two symbol groups transmitted on one UL subframe, with each group including 1 NPRACH symbol, while other TDD configurations may have two symbol groups transmitted on 2 contiguous-in-time UL subframes, with each group including of 2 or 3 NPRACH symbols.

In a non-limiting example, for the TDD configurations (for instance, TDD configurations 2 and 5) with one UL subframe in every half radio frame, one NPRACH preamble may need to fit into one UL subframe, or one UL subframe and additionally the UpPTS duration before the UL subframe if UpPTS may be used for NPRACH transmission. With a subcarrier spacing of 3.75 kHz, each symbol group may include one CP followed by one symbol to fit into one UL subframe, wherein the CP length may be 155.5 μs. The CP length may be extended to 179.3 μs and 203.1 μs, if UpPTS with 1 UL symbol or 2 UL symbols may be used for NPRACH transmission, respectively.

In some embodiments, for TDD configurations with multiple (for instance 2 or 3) contiguous-in-time UL subframes, NPRACH formats may be defined to have two symbol groups fitting into the multiple contiguous-in-time UL subframes. For example, with subcarrier spacing of 3.75 kHz, two symbol groups with each symbol group consisting of one CP followed by two or three symbols may fit into two contiguous UL subframe, with CP length up to 311.1 us or 133.3 us, respectively. To fit into three contiguous UL subframes, two symbol groups may be sent with each symbol group consisting of one CP followed by four or five symbols, with CP length up to 288.8 us or 111 us respectively. With UpPTS before the contiguous UL subframe(s) which may be used for NPRACH transmission, the NPRACH transmission may start from the UpPTS with CP length extended correspondingly. The guard period may need to be added after NPRACH transmission before the end of contiguous UL subframe, which may have similar length as CP.

In some embodiments, for TDD configurations with multiple contiguous UL subframes, NPRACH format defined to have two symbol groups fitting into one UL subframe may be repeated in these UL subframes. In one example, there may be only one guard period added at the end of these contiguous UL subframes. In other words, there may be no guard period between the repetitions of two NPRACH symbol groups, if these NPRACH symbol groups are sent on contiguous UL subframes. In one example, the CP length may be extended due to the reduced guard period. For example, with two UL subframes, there may be four NPRACH symbol groups, with CP length and guard period up to 186.64 us, where each symbol group has a CP followed by one NPRACH symbol, and there may be only one guard period right before the end of 2 contiguous UL subframes. Note that the overhead cost in this embodiment may be larger than the above one.

In some embodiments, the start of NPRACH transmission may be at subframe boundary. Alternatively, the start of NPRACH transmission may be the start of UpPTS. For embodiments where the NPRACH starts from the subframe boundary, one or more of the following may be applicable for the configurable NPRACH resources: a) for TDD configuration 4 or 5, if it is supported, the NPRACH resources may start from SF 2; b) for TDD configuration 2, if it is supported, the NPRACH resources may be at SF 2 or SF 5; c) for TDD configuration 3, if it is supported, the NPRACH resources may start from SF 2 or 3, if NPRACH is designed to be transmitted on 2 contiguous-in-time SFs; d) for TDD configuration 1, if it is supported, the NPRACH resources may start from SF 2 or 7, if NPRACH is designed to be transmitted on 2 contiguous-in-time SFs; e) for TDD configuration 6, if it is supported, the NPRACH resources may start from SF 2 or 3 or 7, if NPRACH is designed to be transmitted on 2 contiguous-in-time SFs; f) for TDD configuration 0, if it is supported, the NPRACH resources may start from SF 2 or 3 or 7 or 8, if NPRACH is designed to be transmitted on 2 contiguous-in-time SFs.

In some embodiments, symbol groups of NPRACH are dropped when there are not enough consecutive valid UL subframes to transmit G symbol groups back-to-back.

In some embodiments, wherein the NPRACH is designed to support transmission on non-continuous SFs, the NPRACH resource may start from any valid UL subframe.

In some embodiments, an NPRACH with subcarrier spacing of 1.25 kHz may be used. Descriptions herein may refer to specific values for one or more parameters (such as the subcarrier spacing and/or other). Embodiments are not limited to those values, however. One or more of the techniques, operations and/or methods described herein may be applicable to cases in which different values are used.

In some embodiments, the NPRACH design may be based on LTE PRACH formats 0-3. The subcarrier spacing of NPRACH may be 1.25 kHz for TDD feNB-IoT systems. The NPRACH symbol duration of this embodiment is 800 us.

In some embodiments, the symbol group may be defined as one CP and one NPRACH symbol. In cases in which each symbol group may need to fit into one UL subframe, the CP length may be a positive real number no more than 200 us. In cases in which there is one UpPTS followed by two UL subframes, two symbol groups may fit into these continuous UL duration, and the CP may be a positive real number no more than 200+UpPTS duration/2. For instance, that duration may be 271.4 us when UpPTS has duration of two symbols with symbol duration of 66.7 us.

In some embodiments, the symbol group may be defined as one CP and N NPRACH symbols, wherein N is a positive integer with N>1, e.g. N=2. The CP length may be any real number no more than 400 us, or 400+UpPTS duration. For instance, that duration may be 542.8 us when UpPTS has duration of two symbols with symbol duration of 66.7 us.

In some embodiments, the NPRACH transmission may be single-tone. In some embodiments, the NPRACH transmission may be multiple tone. In some embodiments, the NPRACH transmission may be single-tone and/or multiple tone. In some embodiment in which single-tone NPRACH transmission is used, an NPRACH sequence may be all "1"s. A scrambling sequence may be used. As another example, frequency hopping similar to the scheme in Rel-13 NPRACH may be used.

In some embodiments in which multi-tone NPRACH transmission is used, the NPRACH sequences may be all "1"s, or may be a ZC sequence. If a ZC sequence is used, denoting the number of tones allocated for NPRACH transmission by K, the ZC sequence may have length of M with M being the largest prime number that is no more than K Cyclic extension may be used to extend the ZC sequence to N. For example, with K=144, a length-139 ZC sequence may be used.

It should be noted that a certain number of guard tones may be needed in cases in which NPUSCH and NPRACH are multiplexed in frequency domain. For example, 3 tones and 2 tones may be left empty at the two ends of NPRACH band as guard tones, and length-139 ZC sequence may be mapped to the central 139 subcarriers of the PRB. As another example, more tones may be left empty as guard tones. For instance, 9 tones and 8 tones may be left empty at the two ends of the NPRACH band, and length-127 ZC sequence may be mapped to the central 127 subcarriers of the PRB. As another example, for K=36, length-31 ZC sequence may be used. This may allow multiplexing of NPRACH and NPUSCH or NPRACH from different UEs 102 in the frequency domain.

In some embodiments, the NPRACH may use a subcarrier spacing of 7.5 kHz and/or NPRACH symbol duration of 133.3 us. In some embodiments, the NPRACH may be based at least partly on an LTE PRACH format 4 and may further be based on one or more of the techniques described below. However, embodiments are not limited to NPRACHs that are based on the PRACH format 4 or any other NPRACH designs. In addition, descriptions herein may refer to specific values for one or more parameters (such as the subcarrier spacing and/or other). Embodiments are not limited to those values, however. One or more of the techniques, operations and/or methods described herein may be applicable to cases in which different values are used.

In some embodiments, a symbol group may be defined as one CP and N NPRACH symbols, wherein N is a positive integer such as 5. For example, CP length may be 66.7 us or 266.7 us as in Rel-13 NPRACH. Alternatively, the CP length may be any value no more than 200 us when N=6, 333.5 us when N=5, or 466.8 us when N=4. With these examples, one symbol group may fit into one UL subframe. With CP length of 66.67 us or 266.7 us and N=5, the remaining time besides the symbol group in the UL subframe may be left as guard period. With continuous 2 UL subframes configured for NPRACH, two symbol groups may be transmitted continuously.

In some embodiments, the NPRACH transmission may be single-tone. In some embodiments, the NPRACH transmission may be multiple tone. In some embodiments, the NPRACH transmission may be single-tone and/or multiple tone.

In some embodiments in which single-tone NPRACH transmission is used, an NPRACH sequence may be all "1"s. A scrambling sequence may be used. As another example, frequency hopping similar to the scheme in LTE Rel-13 NPRACH may be used. In some embodiments, one symbol group may fit into one UL subframe.

In some embodiments in which multi-tone NPRACH transmission is used, the NPRACH sequences may be all "1"s, or may be a ZC sequence. If a ZC sequence is used, denoting the number of tones allocated for NPRACH transmission by K, the ZC sequence may have length of M with M being the largest prime number that is no more than K. Cyclic extension may be used to extend the ZC sequence to K, or K−number of guard tones. For example, with K=24 (occupying the whole PRB), length-23 ZC sequence may be used. Alternatively, K may be smaller to enable the multiplexing between NPRACH and NPUSCH or NPRACH from different UEs in frequency domain. For example, K may be 12, length 7 ZC sequence may be used, with 3 and 2 tones at each end left empty for guard tones.

It should be noted that a number of guard tones may be needed in cases where NPUSCH and NPRACH may be multiplexed in frequency domain. In a non-limiting example, 3 tones and 2 tones may be left empty at the two ends of NPRACH band as guard tones, and length-19 ZC sequence may be mapped to the central 19 subcarriers of the PRB. In another non-limiting example, more tones are left empty as guard tones. For instance, 4 tones and 3 tones may be left empty at the two ends while length-17 ZC sequence may be mapped to the central 17 subcarriers of the PRB, or 6 tones and 5 tones may be left empty at the two ends of the NPRACH band and length-13 ZC sequence may be mapped to the central 13 subcarriers of the PRB.

In some embodiments, a scrambling code may be used. The scrambling code may be applied to symbol level or symbol group level. The scrambling code may be any binary sequence. For instance, a ZC sequence or Hadamard sequence may be used. For symbol-level scrambling, each element of the scrambling sequence may be mapped to every two symbols to keep the orthogonality of OFDM symbols in different tones.

In some embodiments, NPRACH multiplexing may be used. In some embodiments, NPRACH multiplexing in the same time-frequency resources may not necessarily be supported. In some embodiments, orthogonal covering code may be applied to symbol groups that are transmitted back-to-back continuous for NPRACH multiplexing. For example, in cases in which two symbol groups are transmitted in continuous UL subframes, length-2 OCC may be used. Alternatively, the OCC may be applied to symbol level. For example, length N OCC may be applied to 2N symbols, where each element of the OCC is applied to every 2 symbols.

In some embodiments, in cases in which an NPRACH sequence uses a ZC sequence, cyclic shifts in frequency domain and/or different root indexes may be used for NPRACH multiplexing. In some embodiments, in cases in which one NPRACH transmission does not occupy the whole PRB, NPRACH may be multiplexed in frequency domain with other NPRACH and/or NPUSCH transmissions. In cases in which NPRACH and NPUSCH use different SC spacing, a certain number of guard tones may be needed to multiplex NPRACH and NPUSCH in frequency domain.

In some embodiments, NPRACH frequency hopping may be used. In some embodiments, the frequency hopping may be similar to LTE Rel-13 NB-IoT, although the scope of embodiments is not limited in this respect. In some embodiments, frequency hopping may occur between symbol groups. In one example, there may be two levels of frequency hopping. For example, a single-subcarrier hopping may occur between $1^{st}$ and $2^{nd}$ symbol groups, and another hopping may be N-subcarrier hopping between $3^{rd}$ and $4^{th}$ symbol groups. Embodiments are not limited to usage of those particular symbol groups. Example values include but are not limited to N=1, N=6 (for instance, for SC spacing of 3.75 kHz), N=18 (for instance, for SC spacing of 1.25 kHz), and N=3 (for instance, for SC spacing of 7.5 kHz). In addition, in some examples, M-subcarrier hopping may be applied between $2^{nd}$ and $3^{rd}$ symbol groups, for instance M=0, 1 or 6 or other value.

In some embodiments, pseudo-random hopping may be used every X symbol groups (for instance, X=4 or other value). In this example, every 2 symbol groups are transmitted in continuous UL subframes. In the example 1200 in FIG. 12, symbol groups 1210 and 1211 are transmitted in continuous UL subframes. In addition, symbol groups 1220 and 1221 are transmitted in continuous UL subframes. In the example 1200, frequency hopping of one hop between 1210 and 1211 is used, and frequency hopping of six subcarriers between 1220 and 1221 is used. Embodiments are not limited to those numbers of subcarriers. In the example 1200, a subcarrier spacing such as 3.75 kHz, 15 kHz and/or other may be used, although the scope of embodiments is not limited in this respect. In the example 1200, the NPRACHs do not start at the subframe boundary, although the scope of embodiments is not limited in this respect. In some embodiments, the NPRACHs may start at the UpPTS, although the scope of embodiments is not limited in this respect.

In FIG. 13, an example 1300 of NPRACH multiplexing with frequency hopping is shown. NPRACHs labelled as 0-11 are shown for 1st symbol groups 1310, 2nd symbol groups 1315, 3rd symbol groups 1320, and 4th symbol groups 1325. For instance, the 1st, 2nd, 3rd, and 4th symbol groups for NPRACH #0 are 1330, 1331, 1335, and 1336, respectively; the 1st, 2nd, 3rd, and 4th symbol groups for NPRACH #1 are 1340, 1341, 1345, and 1346, respectively. For NPRACH #0, the hopping between 1 st and 2nd symbol groups (1330 and 1331) is one subcarrier; the hopping between 2nd and 3rd symbol groups (1331 and 1335) is six subcarriers. Embodiments are not limited to the number of subcarriers (1 and 6 in this example 1300) of the hops. In the example 1300, the NPRACHs start at the subframe boundary, although the scope of embodiments is not limited in this respect.

In some embodiments, the frequency hopping between 1st symbol group 1310 and 2nd symbol group 1315 may be used for coarse timing estimation, while the frequency hopping between 3rd symbol group 1320 and 4th symbol group 1325 may be used for finer timing estimation. In addition, if the time gap between the transmissions of 2nd symbol group 1315 and 3rd symbol group 1320 is within a channel coherence time, the frequency hopping between the 2nd symbol group 1315 and 3rd symbol group 1320 may also be used for coarse timing estimation. Embodiments are not limited to usage of those particular symbol groups in examples described above.

In some embodiments, frequency hopping may not necessarily be used. For instance, NPRACH with multi-tone transmission may not necessarily use frequency hopping, in some cases.

In some embodiments, multiple NPRACH formats may be supported for LTE Rel-15 TDD feNB-IoT. However, embodiments are not limited to NPRACHs that are based on the LTE Rel-15 TDD feNB-IoT design or any other NPRACH designs. In addition, descriptions herein may refer to specific values for one or more parameters (such as the subcarrier spacing and/or other). Embodiments are not limited to those values, however. One or more of the techniques, operations and/or methods described herein may be applicable to cases in which different values are used.

In some embodiments, the NPRACH configuration, including the resources for NPRACH transmission, number of repetitions, and/or NPRACH formats, may be indicated by higher layer signaling. In a non-limiting example, cell-specific signaling such as SIB1-NB or SIB2-NB may be used. In one example, multiple NPRACH formats may be enabled in the same cell. The time and/or frequency domain resources for each NPRACH format may be dedicated.

In some embodiments, the supported NPRACH formats may depend on TDD configurations. A mapping from configured TDD configuration to supported NPRACH format may be defined, and NPRACH format configuration may be implicitly indicated in this case, by indicating the TDD configuration. In some embodiments, the periodicity in the configuration may be the absolute time, or alternatively may take into account the valid UL subframes. It may be up to eNB configuration to ensure that the periodicity is large enough to avoid the collision between two set of NPRACH resources.

In some embodiments, there may not necessarily be a UL gap introduced during transmission of a set of NPRACH repetitions. In some embodiments, the supported number of repetitions for NPRACH may be increased. This may, in some cases, compensate possible coverage loss due to non-continuous transmission of NPRACH. For example, the number of repetitions may be any subset from {1, 2, 4, 8, 16, 32, 64, 128, 256, 512}, The repetition may still be defined in units of NPRACH symbol group or NPRACH preamble.

In some embodiments, when NPRACH resource and NPUSCH collide, NPUSCH may be postponed to the next available UL subframe without NPRACH resources.

In some embodiments, an NPRACH may be used for TDD feNB-IoT. In some embodiments, the NPRACH may have subcarrier spacing of 1.25 kHz, 3.75 kHz. or 7.5 kHz. In some embodiments, the NPRACH may be single-tone or multi-tone transmission. In some embodiments, an NPRACH symbol group may be defined similar as Rel-13 NB-IoT, or be defined with different number of NPRACH symbols and CP length (for instance, 2, 3 or 4 NPRACH symbols and/or other). In some embodiments, the NPRACH transmission may be on each UL subframe, with X symbol groups, wherein X may be any integer, such as 2, and certain guard time after X symbol groups. In some embodiments, the NPRACH transmission may be on at least two contiguous-in-time UL subframe, with X symbol groups, wherein X is any integer, such as 2, and certain guard time after X symbol groups. In some embodiments, the NPRACH may start from subframe boundary. In some embodiments, the NPRACH may start from a UpPTS. In some embodiments, NPRACH resources may be indicated by higher layer signaling, such as SIB2-NB and/or other. In some embodiments, a supported number of repetitions may be increased for NPRACH in TDD systems. In some embodiments, NPUSCH may be postponed to next available valid UL subframe without NPRACH, if it collides with NPRACH. In some embodiments, different NPRACH formats in terms of different number of NPRACH symbols per symbol group may be configured, or different number of repetitions of NPRACH symbol groups (for instance, 2 or 4 or 6 symbol groups and/or other) may be configured to fit into the cases with multiple contiguous UL subframes. In some embodiments, different NPRACH formats may be configured for a NB-IoT cell, and the time and/or frequency domain resources may be dedicated for each NPRACH format. In some embodiments, a supported NPRACH format for a NB-IoT cell may depend on the TDD configuration. In some embodiments, a supported NPRACH format may be indicated implicitly by the configured TDD configuration. For instance, a mapping from configured TDD configuration to supported NPRACH format may be defined.

In some embodiments, some protocols (such as LTE Rel-13 NB-IoT, Rel-14 eNB-IoT and/or others) may support FDD but not TDD. In some embodiments, some protocols (such as LTE Rel-15 feNB-IoT WI) may support TDD and/or FDD.

In some embodiments, TDD may be supported in accordance with one or more of: in-band, guard-band, and stand-alone operation modes of NB-IoT. In some cases, it may be assumed that no UL compensation gaps are needed by UE, although the scope of embodiments is not limited in this respect.

In some embodiments, in some protocols (including but not limited to LTE Rel-13 NB-IoT, LTE Rel-14 eNB-IoT and/or others), multiple NB-IoT carriers are supported. The NB-IoT carrier with NPSS/NSSS/NPBCH is defined as the anchor carrier. The configuration of non-anchor carriers is indicated by SIB1-NB. For systems with multiple NB-IoT carriers, enabling frequency hopping (FH) across NB-IoT carriers may provide frequency diversity gain and help improve the performance.

In some embodiments, a FH mechanism may be used for TDD feNB-IoT cells configured with multiple NB-IoT carriers. The usage of FH may provide a performance improvement, in some cases.

In some embodiments, support of FH may be indicated to the eNB 104 by signaling from the UE 102, including but not limited to capability signaling. Until such information is received, the eNB 104 would not configure an NB-IoT UE 102 with FH.

In some embodiments, the FH may be semi-statically configured via higher layer signaling. In a non-limiting example, a FH configuration may be cell-specific. In another non-limiting example, usage of FH may be UE-specific, while at least a part of the FH configuration parameters may be cell-specific (such as an FH interval and/or others). In another non-limiting example, the FH configuration may be UE-specific, wherein the usage of FH for different physical channels and configuration parameters may be UE-specific.

It should be noted that a configuration mechanism of FH parameters for different channels may be different. For example, the configuration of FH parameters for SIB1-NB or other Narrowband System Information (NB-SI) messages may be cell-specific, while the FH parameters for unicast NPDSCH/NPUSCH (except the transmissions during random access procedure) may be UE-specific. In some examples, the NPUSCH format 2 for message 4 may be cell-specific.

In some embodiments, for unicast NPDSCH/NPUSCH, if a higher layer enables the use of FH, the DCI may include one or more bits (such as a 1-bit flag and/or other) to indicate whether the scheduled NPDSCH/NPUSCH uses FH or not.

It should be noted that an FH mechanism for SIB1-NB may be applicable to embodiments in which SIB1-NB may be transmitted on non-anchor carriers, although the scope of embodiments is not limited in this respect.

In some embodiments, when FH is configured, a same NB-IoT carrier is maintained for a certain number of subframes, denoted by $Y_{CH}$. In other words, the NB-IoT carrier is switched every $Y_{CH}$ subframes, which is called the "FH interval." The FH interval $Y_{CH}$ may be predefined, or configured by higher layer signaling as a part of the FH configuration. For example, $Y_{CH}$ may be {1, 5, 10, 20} or {5, 10, 20, 40} for TDD feNB-IoT. The mechanism described above may be similar to an FH mechanism used in an LTE protocol (including but not limited to Rel-13 eMTC), although the scope of embodiments is not limited in this respect.

In some embodiments, multiple sets may be supported for an FH interval, wherein which set is to be used may depend on factors such as coverage and/or other(s). For example, for deep coverage, the set with larger values of $Y_{CH}$ may be used, otherwise the set with smaller values of $Y_{CH}$ may be used. In a non-limiting example, the coverage may be determined by the coverage level of NPRACH. For instance, a set with larger values of $Y_{CH}$ for CE level 1 and 2, and a set with smaller values of $Y_{CH}$ for CE level 0. In another non-limiting example, the coverage may be determined by a maximum number of repetitions (referred to as Rmax, without limitation). For instance, a set with larger values of $Y_{CH}$ for Rmax>X, and a set with smaller values of $Y_{CH}$ for Rmax<=X, wherein X may be any integer (including but not limited to 32).

In some embodiments, the FH interval takes into account the subframe with actual transmission (that is, valid DL subframes carrying NPDCCH/NPDSCH or valid UL subframes carrying NPUSCH transmission). Alternatively, the FH interval depends on the absolute number of subframes.

In some embodiments, in TDD feNB-IoT cells, the FH offset granularity may be 1 NB-IoT carrier (that is, 1 PRB). The FH offset may be configured by higher layer signaling, in terms of K NB-IoT carriers where K is a positive integer.

In some embodiments, the configured NB-IoT carriers are indexed by order 0, 1, . . . , N_NB−1, where N_NB denotes the total number of configured NB-IoT carriers. The hopped NB-IoT carrier may be given by NB1=(NB0+FH_offset) modulo N_NB, where NB1 is the index of hopped NB-IoT carrier, and NB0 is the previous NB-IoT carrier.

In some embodiments, a set of NB-IoT carriers to which the UE is to hop may be configured by the eNB 104 and may be indexed by order. When FH is enabled, the UE 102 may hop to the NB-IoT carriers according to a FH sequence. The FH sequence may be predefined, or configured by higher layer signaling (either cell-specific or UE-specific signaling). A mapping may also be defined to generate the FH sequence based on the PCID. In a non-limiting example, the sequence may be {(PCID modulo N_NB), (PCID+floor (N_NB/2)) modulo N_NB}, or {(PCID modulo N_NB), (PCID+floor(N_NB/4)) modulo N_NB, (PCID+floor (N_NB/2)) modulo N_NB, (PCID+floor(N_NB*¾)) modulo N_NB}, where N_NB is the number of NB-IoT carriers to be hopped to. In a non-limiting example, an FH sequence of {0, 1, . . . , N_NB−1} may be used. In another non-limiting example, N_NB=2 and the FH sequence is {0, 1}. Thus, FH occurs between two NB-IoT carriers.

In some embodiments, different physical channels may use different FH mechanisms. In a non-limiting example, the NPUSCH format 2 and SIB1-NB may use FH between K configured NB-IoT carriers (that is, the sequence cycles through the K carriers), wherein K may be any integer such as K=2 or 4. The value of K may also depend on the total number of configured NB-IoT carriers N_NB. For example, K=2 for N_NB<=X and K=4 for N_NB>X, where X may be integer such as 3, 4, or 6. In another non-limiting example, the unicast NPDSCH and NPUSCH format 1 may use a technique in which the NB-IoT carrier to which the UE 102 is to hop may be calculated by (NB0+FH_offset) modulo N_NB.

In some embodiments, FH for SIB1-NB may be configured by MIB-NB. For example, the spare bits in MIB-NB may indicate whether the FH for SIB1-NB is supported, and/or configure some FH parameters for SIB1-NB FH such as FH interval, the FH offset (if FH mechanism is based on FH offset), and/or the NB-IoT carriers to be hopped (for instance, if the FH mechanism is such that FH occurs between K NB-IoT carriers).

In some embodiments, FH for paging NPDCCH/NPDSCH and system information other than SIB1-NB may be configured by cell-specific higher layer signaling. In a non-limiting example, SIB1-NB may be used.

In some embodiments, FH for RAR/Msg3/Msg4 and NPUSCH format 2 may also be configured by cell-specific higher layer signaling. In a non-limiting example, SIB1-NB may be used. In another non-limiting example, other system information (such as SIB2-NB and/or other) may be used.

In some embodiments, for in-band modes, for a frequency retuning mechanism, the operation of retuning to another NB-IoT carrier for DL transmission uses legacy PDCCH region as guard period. For UEs 102 requiring two-symbol retuning duration, one or more of the following methods may be considered for retuning to another NB-IoT for NPUSCH transmission. In some embodiments, the retuning from NPUSCH format 1 to NPUSCH format 1, or from NPUSCH format 2 to NPUSCH format 2, uses the last symbol of earlier subframe and first symbol of the latter subframe as guard period.

In some embodiments, for retuning between NPUSCH format 1 and format 2, one or more of the following methods may be used. In some embodiments, the retuning from NPUSCH format 2 to NPUSCH format 1 uses the first two symbol of the latter subframe as guard period. The retuning from NPUSCH format 1 to NPUSCH format 2 uses the last two symbol of the earlier subframe as guard period. In some embodiments, the retuning from NPUSCH format 2 to NPUSCH format 1 and the retuning from NPUSCH format 1 or NPUSCH format 2 uses the last symbol of earlier subframe and the first symbol of latter subframe as guard period. This is possible due to that NPUCCH is multiplexed via FDM in NB-IoT instead of CDM via OCC as in eMTC. Thus, it may not be necessary, in some cases, to additionally protect NPUCCH format 2 compared to NPUSCH format 1 in NB-IoT. In some embodiments, for the retuning from NPRACH to NPRACH across NB-IoT carrier, it may be up to UE 102 implementation regarding the retuning gap.

In some embodiments, if there are some NB-IoT UEs 102 supporting retuning gap within 1 symbol (which may be indicated by UE capability signaling and/or other signaling), the following retuning gap may be considered. The retuning from NPUSCH format 1 to NPUSCH format 1 uses the last symbol of earlier subframe as guard period. The retuning from NPUSCH format 2 to NPUSCH format 2 uses the last symbol of earlier subframe as guard period. The retuning from NPUSCH format 1 to NPUSCH format 2 uses last symbol of earlier subframe as guard period. The retuning from NPUSCH format 2 to NPUSCH format 1 uses the first symbol of the next subframe as guard period.

In some embodiments, for guard band/standalone modes, the retuning to another NB-IoT carrier for UL transmission may follow the above embodiments. For the retuning to another NB-IoT carrier for DL transmission, the retuning gap for NPBCH transmission may still follow the in-band mode, where the first few symbols corresponding to the LTE control region may be used. For other NPDCCH/NPDSCH transmissions, one or more of the following embodiments may be considered (although additional embodiments are also possible). For UEs 102 requiring two-symbol retuning duration: a) in some embodiments, the retuning from NPDSCH to NPDSCH, or from NPDCCH to NPDCCH, uses the last symbol of earlier subframe and first symbol of the latter subframe as guard period, b) in some embodiments, the retuning from NPDSCH to NPDSCH, or from NPDCCH to NPDCCH, uses the last two symbols of earlier subframe as guard period, c) the retuning from NPDSCH to NPDSCH, or from NPDCCH to NPDCCH, uses the first two symbols of next subframe as guard period.

In some embodiments, if there are some NB-IoT UEs 102 supporting retuning gap within 1 symbol (which may be indicated by UE capability signaling and/or other signaling), one or more of the following may be used (although additional embodiments are also possible). In some embodiments, the retuning from NPDSCH to NPDSCH, or from NPDCCH to NPDCCH, uses the last symbol of earlier subframe as guard period. In some embodiments, the retuning from NPDSCH to NPDSCH, or from NPDCCH to NPDCCH, uses the first symbol of next subframe as guard period. In some of the embodiments described above, the affected NPUSCH/NPDCCH/NPDSCH symbols may be punctured.

In some embodiments, for NPDCCH and NPDSCH in guard-band or stand-alone operation modes, retuning periods are generated at the UE 102 receiver based on receiver-side puncturing. That is, the eNB 104 transmits all symbols in the subframe for NPDCCH or NPDSCH and different UEs 102 receive the symbols depending on their respective retuning times via UE 102 implementation by discarding those symbols or their corresponding soft-bit information. For instance, Log Likelihood Ratios (LLRs)) that are impacted by the retuning may be used.

In some embodiments, frequency hopping for TDD may be supported in feNB-IoT. In some embodiments, the frequency hopping may be supported for different physical channels such as NPDCCH, NPDSCH, NPUSCH, NPRACH and/or other. In some embodiments, the support of frequency hopping may be indicated by UE capability. In some embodiments, the frequency hopping configuration may be cell-specific and/or UE-specific, and the configuration may be different for different channels. In some embodiments, the frequency interval may be predefined or configured by higher layer signaling, which may take into account subframes with actual transmission or absolute subframes. In some embodiments, the frequency hopping mechanism may be extended from eMTC frequency hopping scheme by changing the 6-PRB narrowband to 1-PRB NB-IoT carrier, or be based on a frequency hopping sequence. In some embodiments, the frequency hopping for some common channels may be indicated by MIB-NB or SIB-NB. In some embodiments, a frequency retuning gap may follow eMTC design, or be symmetric between the NPUSCH format 1 and format 2 retuning. In some embodiments, a new frequency retuning rule for DL transmission may be defined for guard-band and standalone operation modes, different from in-band mode. In some embodiments, the eNB 104/gNB 105 may transmit all symbols for DL transmission and it is up to UE implementation to puncture some symbols for retuning guard period.

In Example 1, an apparatus of a User Equipment (UE) may comprise memory. The apparatus may further comprise processing circuitry. The processing circuitry may be configured to decode a narrowband physical downlink control channel (NPDCCH) that schedules a transmission, by the UE, of a narrowband physical uplink shared channel (NPUSCH) in one or more radio frames. The radio frames may be configured for time-division duplexing (TDD) operation. Subframes of the radio frames may include uplink subframes and downlink subframes. The processing circuitry may be further configured to determine an uplink scheduling delay for the transmission of the NPUSCH based on a sum of a predetermined first number of subframes and a variable second number of subframes. The second number of subframes may be based on a window of variable size. The window may start when the first number of subframes has elapsed since reception of the NPDCCH. The window may end when a number of uplink subframes has elapsed since the start of the window. The number of uplink subframes may be indicated by an uplink scheduling parameter included in the NPDCCH. The memory may be configured to store information identifying the uplink scheduling parameter.

In Example 2, the subject matter of Example 1, wherein the window may include the number of uplink subframes indicated by the uplink scheduling parameter, and a variable number of downlink subframes that depends on a starting subframe index of the window within the one or more radio frames.

In Example 3, the subject matter of one or any combination of Examples 1-2, wherein the size of the window may be based on a count of valid uplink subframes.

In Example 4, the subject matter of one or any combination of Examples 1-3, wherein the processing circuitry may be further configured to encode the NPUSCH for transmission in accordance with: a single-tone transmission in one subcarrier per symbol period, or a multi-tone transmission in 3, 6, or 12 subcarriers per symbol period.

In Example 5, the subject matter of one or any combination of Examples 1-4, wherein the processing circuitry may be further configured to determine a transmission window for the transmission of the NPUSCH. The processing circuitry may be further configured to, if the transmission window includes one or more downlink subframes: refrain from monitoring for other NPDCCHs during the downlink subframes of the transmission.

In Example 6, the subject matter of one or any combination of Examples 1-5, wherein the processing circuitry may be further configured to determine a transmission window for the transmission of the NPUSCH. The processing circuitry may be further configured to, if the transmission window includes one or more downlink subframes, and if the NPUSCH is a type-2 NPUSCH for transmission of hybrid automatic repeat request (HARQ) feedback: refrain from monitoring for other NPDCCHs during the downlink subframes of the transmission window.

In Example 7, the subject matter of one or any combination of Examples 1-6, wherein the processing circuitry may be further configured to refrain from monitoring for other NPDCCHs before an end time of the transmission of the NPUSCH.

In Example 8, the subject matter of one or any combination of Examples 1-7, wherein the processing circuitry may be further configured to decode a system information block type-1 narrowband (SIB1-NB) that indicates a subframe configuration for the one or more radio frames. The subframe configuration may include one or more downlink subframes, one or more uplink subframes, and one or more special subframes. Each special subframe may occur immediately after one of the downlink subframes and immediately before one of the uplink subframes. The subframe configuration may be included in candidate subframe configurations. The processing circuitry may be further configured to encode the NPUSCH for transmission in accordance with a subcarrier spacing of 3.75 kilohertz (kHz) or 15 kHz. If the NPUSCH is encoded in accordance with the subcarrier spacing of 3.75 kHz, the candidate subframe configurations may be restricted to: a first candidate subframe configuration that includes a downlink subframe, followed by a special subframe, followed by two uplink subframes, followed by two other downlink subframes, followed by another special subframe, followed by two other uplink subframes, followed by another downlink subframe; and a second candidate subframe configuration that includes a downlink subframe, followed by a special subframe, followed by two uplink subframes, followed by six other downlink subframes.

In Example 9, the subject matter of one or any combination of Examples 1-8, wherein, if the NPUSCH is encoded in accordance with the subcarrier spacing of 15 kHz: the candidate subframe configurations may include the first and second candidate subframe configurations and at least one other candidate subframe configuration.

In Example 10, the subject matter of one or any combination of Examples 1-9, wherein the processing circuitry may be further configured to encode the NPUSCH based on a maximum transport block size of 1000 bits or 2536 bits.

In Example 11, the subject matter of one or any combination of Examples 1-10, wherein the UE may be arranged to operate in accordance with a further enhanced narrowband internet-of-things (feNB-IoT) protocol.

In Example 12, the subject matter of one or any combination of Examples 1-11, wherein the apparatus may further include a transceiver to receive the NPDCCH.

In Example 13, the subject matter of one or any combination of Examples 1-12, wherein the processing circuitry may include a baseband processor to decode the NPDCCH.

In Example 14, a computer-readable storage medium may store instructions for execution by one or more processors to perform operations for communication by a User Equipment (UE). The operations may configure the one or more processors to decode a system information block type-1 narrowband (SIB1-NB) that indicates a subframe configuration for a radio frame configured for time-division duplexing (TDD) operation. The subframe configuration may include one or more downlink subframes and one or more uplink subframes. The operations may further configure the one or more processors to encode, for transmission, a narrowband physical downlink random access channel (NPRACH) preamble. The NPRACH preamble may be mapped to multiple symbol groups. Each symbol group may include contiguous symbol periods and a cyclic prefix (CP) portion. A number of symbol periods per symbol group may depend at least partly on a number of contiguous uplink subframes in the subframe configuration.

In Example 15, the subject matter of Example 14, wherein the symbol groups may be continuous in time in the uplink subframes.

In Example 16, the subject matter of one or any combination of Examples 14-15, wherein a number of symbols per symbol group may be one of: one, two, three, and four.

In Example 17, the subject matter of one or any combination of Examples 14-16, wherein the operations may further configure the one or more processors to select an NPRACH format from candidate NPRACH formats based at least partly on the subframe configuration indicated in the SIB1-NB. Each NPRACH format may include a number of symbol groups per NPRACH preamble and further includes the number of symbol periods per symbol group.

In Example 18, the subject matter of one or any combination of Examples 14-17, wherein the operations may further configure the one or more processors to encode the NPRACH preamble for transmission in accordance with frequency hopping between symbol groups.

In Example 19, the subject matter of one or any combination of Examples 14-18, wherein the operations may further configure the one or more processors to encode the NPRACH preamble in a first symbol group, a second symbol group, a third symbol group, and a fourth symbol group. The operations may further configure the one or more processors to encode the NPRACH preamble in accordance with frequency hopping by: a first frequency spacing between the first symbol group and the second symbol group; and a second frequency spacing between the third symbol group and the fourth symbol group.

In Example 20, the subject matter of one or any combination of Examples 14-19, wherein the first frequency spacing may be one subcarrier, and the second frequency spacing may be six subcarriers.

In Example 21, an apparatus of a generation Node-B (gNB) may comprise memory. The apparatus may further comprise processing circuitry. The processing circuitry may be configured to encode, for transmission, a narrowband physical downlink control channel (NPDCCH) that indicates a number of uplink subframes for an uplink scheduling delay of a transmission, by a User Equipment (UE), of a narrowband physical uplink shared channel (NPUSCH) in a radio frame. The radio frame may be configured for time-division duplexing (TDD) operation. Subframes of the radio frames may include uplink subframes and downlink subframes. The processing circuitry may be further configured to determine, for the NPUSCH, an uplink scheduling delay that is based on an earliest subframe after: a predetermined number of subframes has elapsed with respect to a subframe of the NPDCCH, and a window of subframes has elapsed after the predetermined number of subframes. A number of uplink subframes in the window may be equal to the number of uplink subframes indicated by the NPDCCH. The memory may be configured to store at least a portion of the NPDCCH.

In Example 22, the subject matter of Example 21, wherein the number of uplink subframes indicated in the NPDCCH may be based on a count of valid uplink subframes.

In Example 23, the subject matter of one or any combination of Examples 21-22, wherein the processing circuitry may be further configured to monitor for the NPUSCH in one or more uplink subframes in accordance with the uplink scheduling delay.

In Example 24, the subject matter of one or any combination of Examples 21-23, wherein the processing circuitry may be further configured to encode, for transmission, a system information block type-1 narrowband (SIB1-NB) that indicates a subframe configuration for the radio frames. The subframe configuration may include one or more downlink subframes, one or more uplink subframes, and one or more special subframes.

In Example 25, an apparatus of a User Equipment (UE) may comprise means for decoding a system information block type-1 narrowband (SIB1-NB) that indicates a subframe configuration for a radio frame configured for time-division duplexing (TDD) operation. The subframe configuration may include one or more downlink subframes and one or more uplink subframes. The apparatus may further comprise means for encoding, for transmission, a narrowband physical downlink random access channel (NPRACH) preamble. The NPRACH preamble may be mapped to multiple symbol groups. Each symbol group may include contiguous symbol periods and a cyclic prefix (CP) portion. A number of symbol periods per symbol group may depend at least partly on a number of contiguous uplink subframes in the subframe configuration.

In Example 26, the subject matter of Example 25, wherein the symbol groups may be continuous in time in the uplink subframes.

In Example 27, the subject matter of one or any combination of Examples 25-26, wherein a number of symbols per symbol group may be one of: one, two, three, and four.

In Example 28, the subject matter of one or any combination of Examples 25-27, wherein the apparatus may further comprise means for selecting an NPRACH format from candidate NPRACH formats based at least partly on the subframe configuration indicated in the SIB1-NB. Each NPRACH format may include a number of symbol groups per NPRACH preamble and may further include the number of symbol periods per symbol group.

In Example 29, the subject matter of one or any combination of Examples 25-28, wherein the apparatus may further comprise means for encoding the NPRACH preamble for transmission in accordance with frequency hopping between symbol groups.

In Example 30, the subject matter of one or any combination of Examples 25-29, wherein the apparatus may further comprise means for encoding the NPRACH preamble in a first symbol group, a second symbol group, a third symbol group, and a fourth symbol group. The apparatus may further comprise means for encoding the NPRACH preamble in accordance with frequency hopping by: a first frequency spacing between the first symbol group and the second symbol group; and a second frequency spacing between the third symbol group and the fourth symbol group.

In Example 31, the subject matter of one or any combination of Examples 25-30, wherein the first frequency spacing may be one subcarrier. The second frequency spacing may be six subcarriers.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
a memory; and
at least one processor in communication with the memory and configured to:
decode a system information block type-1 narrowband (SIB1-NB) that indicates a subframe configuration for a radio frame configured for time-division duplexing (TDD) operation; and
encode, for transmission, a narrowband physical random access channel (NPRACH) preamble based on the subframe configuration, wherein the NPRACH preamble is mapped to multiple symbol groups, wherein each symbol group includes contiguous symbol periods and a cyclic prefix (CP) portion, and wherein a number of symbol periods per symbol group depends, at least partly, on a number of contiguous uplink subframes in the subframe configuration.

2. The apparatus of claim 1,
wherein the subframe configuration includes one or more downlink subframes and one or more uplink subframes.

3. The apparatus of claim 2,
wherein the symbol groups are continuous in time in the uplink subframes.

4. The apparatus of claim 1,
wherein a number of symbols per symbol group is at least one of:
one symbol per symbol group;
two symbols per symbol group;
three symbols per symbol group; or
four symbols per symbol group.

5. The apparatus of claim 1,
wherein the at least one processor is further configured to:
select an NPRACH format from candidate NPRACH formats based, at least partly, on the subframe configuration indicated in the SIB 1-NB, wherein each NPRACH format includes a number of symbol groups per NPRACH preamble and the number of symbol periods per symbol group.

6. The apparatus of claim 1,
wherein the at least one processor is further configured to:
encode the NPRACH preamble for transmission in accordance with frequency hopping between symbol groups.

7. The apparatus of claim 1,
wherein the at least one processor is further configured to:
encode the NPRACH preamble in a first symbol group, a second symbol group, a third symbol group, and a fourth symbol group; and
encode the NPRACH preamble in accordance with frequency hopping by a first frequency spacing between the first symbol group and the second symbol group and a second frequency spacing between the third symbol group and the fourth symbol group, wherein the first frequency spacing is one subcarrier, and wherein the second frequency spacing is six subcarriers.

8. A user equipment (UE), comprising:
at least one antenna;
at least one radio in communication with the antenna; and
at least one processor in communication with the at least one radio and configured to cause the UE to:
decode a system information block type-1 narrowband (SIB1-NB) that indicates a subframe configuration for a radio frame configured for time-division duplexing (TDD) operation; and
encode, for transmission, a narrowband physical random access channel (NPRACH) preamble, wherein the NPRACH preamble is mapped to multiple symbol groups, and wherein a number of symbol periods per symbol group depends, at least partly, on a number of contiguous uplink subframes in the subframe configuration.

9. The UE of claim 8,
wherein the subframe configuration includes one or more downlink subframes and one or more uplink subframes.

10. The UE of claim 8,
wherein each symbol group includes contiguous symbol periods and a cyclic prefix (CP) portion.

11. The UE of claim 8,
wherein the symbol groups are continuous in time in the uplink subframes.

12. The UE of claim 8,
wherein the at least one processor is further configured to cause the UE to:
 select an NPRACH format from candidate NPRACH formats based, at least partly, on the subframe configuration indicated in the SIB 1-NB, wherein each NPRACH format includes a number of symbol groups per NPRACH preamble and the number of symbol periods per symbol group.

13. The UE of claim 8,
wherein the at least one processor is further configured to cause the UE to:
 encode the NPRACH preamble for transmission in accordance with frequency hopping between symbol groups.

14. The UE of claim 8,
wherein a number of symbols per symbol group is at least one of:
 one symbol per symbol group;
 two symbols per symbol group;
 three symbols per symbol group; or
 four symbols per symbol group.

15. A non-transitory computer-readable storage medium storing program instructions executable by one or more processors to cause a user equipment (UE) to:
 decode a system information block type-1 narrowband (SIB1-NB) that indicates a subframe configuration for a radio frame configured for time-division duplexing (TDD) operation, wherein the subframe configuration includes one or more downlink subframes and one or more uplink subframes; and
 encode, for transmission, a narrowband physical random access channel (NPRACH) preamble, wherein the NPRACH preamble is mapped to multiple symbol groups, wherein each symbol group includes contiguous symbol periods and a cyclic prefix (CP) portion, and wherein a number of symbol periods per symbol group depends, at least partly, on a number of contiguous uplink subframes in the subframe configuration.

16. The non-transitory computer-readable storage medium of claim 15,
wherein the symbol groups are continuous in time in the uplink subframes.

17. The non-transitory computer-readable storage medium of claim 15,
wherein a number of symbols per symbol group is at least one of:
 one symbol per symbol group;
 two symbols per symbol group;
 three symbols per symbol group; or
 four symbols per symbol group.

18. The non-transitory computer-readable storage medium of claim 15,
wherein the program instructions are further executable by the one or more processors to cause the UE to:
 select an NPRACH format from candidate NPRACH formats based, at least partly, on the subframe configuration indicated in the SIB 1-NB, wherein each NPRACH format includes a number of symbol groups per NPRACH preamble and the number of symbol periods per symbol group.

19. The non-transitory computer-readable storage medium of claim 15,
wherein the program instructions are further executable by the one or more processors to cause the UE to:
 encode the NPRACH preamble for transmission in accordance with frequency hopping between symbol groups.

20. The non-transitory computer-readable storage medium of claim 15,
wherein the program instructions are further executable by the one or more processors to cause the UE to:
 encode the NPRACH preamble in a first symbol group, a second symbol group, a third symbol group, and a fourth symbol group; and
 encode the NPRACH preamble in accordance with frequency hopping by a first frequency spacing between the first symbol group and the second symbol group and a second frequency spacing between the third symbol group and the fourth symbol group, wherein the first frequency spacing is one subcarrier, and wherein the second frequency spacing is six subcarriers.

* * * * *